(12) United States Patent
Deshmukh

(10) Patent No.: US 11,915,330 B2
(45) Date of Patent: Feb. 27, 2024

(54) SECURE TOKENS FOR CONTROLLING ACCESS TO A RESOURCE IN A RESOURCE DISTRIBUTION NETWORK

(71) Applicant: Landis+Gyr Innovations, Inc., Alpharetta, GA (US)

(72) Inventor: Pushpesh Kumar Deshmukh, Alpharetta, GA (US)

(73) Assignee: Landis+Gyr Technology, Inc., Alpharetta, GA (US)

( * ) Notice: Subject to any disclaimer, the term of this patent is extended or adjusted under 35 U.S.C. 154(b) by 0 days.

(21) Appl. No.: 17/953,707

(22) Filed: Sep. 27, 2022

(65) Prior Publication Data

US 2023/0029357 A1    Jan. 26, 2023

Related U.S. Application Data

(62) Division of application No. 16/656,665, filed on Oct. 18, 2019, now Pat. No. 11,481,851.

(51) Int. Cl.
*G06Q 20/00* (2012.01)
*G06Q 50/06* (2012.01)
(Continued)

(52) U.S. Cl.
CPC ......... *G06Q 50/06* (2013.01); *G06Q 20/3823* (2013.01); *G06Q 20/3829* (2013.01); *G06Q 30/0284* (2013.01); *G06Q 2220/12* (2013.01)

(58) Field of Classification Search
USPC .......................... 705/16, 21, 59; 380/44, 262
See application file for complete search history.

(56) References Cited

U.S. PATENT DOCUMENTS

| 8,316,237 | B1 | 11/2012 | Felsher et al. |
| 11,030,595 | B1 | 6/2021 | David et al. |

(Continued)

FOREIGN PATENT DOCUMENTS

| CN | 1780468 | 5/2006 |
| CN | 104318671 | 1/2015 |

(Continued)

OTHER PUBLICATIONS

For Ref Included (Year: 2013).*
(Continued)

*Primary Examiner* — Dante Ravetti
(74) *Attorney, Agent, or Firm* — Kilpatrick Townsend & Stockton LLP

(57) ABSTRACT

A system for generating and applying a secure token in a resource distribution network is provided. For example, a headend system generates a time-based token based on a time duration specified for a meter. The time-based token indicates the time duration for the meter. The time-based token is further generated based on an identifier of the meter. The headend system transmits the time-based token to the meter via at least a mesh network. After receiving the time-based token, the meter validates the time-based token to determine that the time-based token is generated for the meter based on information related to the identifier of the meter. If the meter determines that the time-based token is valid, the meter connects premises associated with the meter to a resource distribution network for at least the time duration specified in the time-based token.

20 Claims, 16 Drawing Sheets

(51) Int. Cl.
  *G06Q 20/38* (2012.01)
  *G06Q 30/0283* (2023.01)

(56) References Cited

U.S. PATENT DOCUMENTS

| | | |
|---|---|---|
| 11,481,851 B2 | 10/2022 | Deshmukh |
| 11,481,852 B2 | 10/2022 | Deshmukh |
| 11,544,802 B2 | 1/2023 | Nest et al. |
| 2002/0026394 A1 | 2/2002 | Savage et al. |
| 2003/0128134 A1 | 7/2003 | Fierro et al. |
| 2005/0283444 A1 | 12/2005 | Ekberg |
| 2007/0083479 A1 | 4/2007 | Swartz et al. |
| 2007/0255651 A1 | 11/2007 | Egetoft |
| 2010/0206533 A1 | 8/2010 | Sakakibara et al. |
| 2010/0306533 A1 | 12/2010 | Phatak |
| 2012/0131100 A1 | 5/2012 | Van Olst et al. |
| 2012/0137126 A1 | 5/2012 | Matsuoka et al. |
| 2013/0124850 A1 | 5/2013 | Gomez Marmol et al. |
| 2013/0212005 A1 | 8/2013 | Marincola et al. |
| 2013/0282587 A1 | 10/2013 | Le Buhan et al. |
| 2013/0326214 A1 | 12/2013 | McCanna et al. |
| 2014/0114853 A1 | 4/2014 | Guedj |
| 2014/0165155 A1 | 6/2014 | Zhang |
| 2015/0195268 A1 | 7/2015 | Fang |
| 2019/0295077 A1 | 9/2019 | Mardikar |

FOREIGN PATENT DOCUMENTS

| | | | |
|---|---|---|---|
| CN | 104616137 | 5/2015 | |
| JP | 2001356025 A | 12/2001 | |
| JP | 2007010123 A | 1/2007 | |
| JP | 2014206398 A | 10/2014 | |
| JP | 2017016564 A | 1/2017 | |
| JP | 2018506770 A | 3/2018 | |
| JP | 2019030088 A | 2/2019 | |
| KR | 100653139 | 12/2006 | |
| KR | 20140089077 | 7/2014 | |
| WO | 0058922 | 10/2000 | |
| WO | 2013024135 A1 | 2/2013 | |
| WO | WO-2013024135 A1 * | 2/2013 | ............ G01D 4/004 |
| WO | 2014077665 A1 | 5/2014 | |
| WO | 2016094122 | 6/2016 | |
| WO | 2016168503 | 10/2016 | |

OTHER PUBLICATIONS

U.S. Appl. No. 16/656,615, Final Office Action dated Jan. 19, 2023, 36 pages.
Australian Application No. 2020367793, Notice of Acceptance dated Dec. 12, 2022, 3 pages.
Canadian Application No. 3,157,850, Office Action dated Oct. 17, 2022, 3 pages.
AU2020367793, First Examination Report, dated Aug. 8, 2022, 3 pages.
Batiller et al., Prepaid Metering System for Isolated Microgrids, Institute of Electrical and Electronics Engineers Innovative Smart Grid Technologies—Asia (ISGT—Asia), Nov. 28-Dec. 1, 2016, pp. 529-534.
International Patent Application No. PCT/US2020/055631, International Search Report and Written Opinion, dated Jan. 25, 2021, 14 pages.
International Patent Application No. PCT/US2020/055635, International Search Report and Written Opinion, dated Jan. 28, 2021, 14 pages.
International Patent Application No. PCT/US2020/055636, International Search Report and Written Opinion, dated Jan. 28, 2021, 14 pages.
International Application No. PCT/US2020/055631, International Preliminary Report on Patentability dated Apr. 28, 2022, 11 pages.
International Application No. PCT/US2020/055635, International Preliminary Report on Patentability dated Apr. 28, 2022, 11 pages.
International Application No. PCT/US2020/055636, International Preliminary Report on Patentability dated Apr. 28, 2022, 12 pages.
U.S. Appl. No. 16/656,615, Non-Final Office Action dated May 26, 2022, 34 pages.
U.S. Appl. No. 16/656,718, Non-Final Office Action dated Mar. 4, 2022, 10 pages.
U.S. Appl. No. 16/656,718, Notice of Allowance dated Jun. 29, 2022, 9 pages.
U.S. Appl. No. 16/656,615, Notice of Allowance, dated Jun. 12, 2023, 31 pages.
U.S. Appl. No. 16/656,665, Notice of Allowance dated Feb. 24, 2022, 17 pages.
U.S. Appl. No. 16/656,665, Notice of Allowance dated Jul. 5, 2022, 9 pages.

* cited by examiner

SECURE TOKENS FOR CONTROLLING ACCESS TO A RESOURCE IN A RESOURCE DISTRIBUTION NETWORK

CROSS-REFERENCE TO RELATED APPLICATION

This is a division of U.S. patent application Ser. No. 16/656,665 filed on Oct. 18, 2019, and titled "Secure Tokens for Controlling Access to a Resource in a Resource Distribution Network," the contents of which is incorporated herein in its entirety.

TECHNICAL FIELD

This disclosure relates generally to controlling access to a resource in a resource distribution network. More particularly, this disclosure relates to generating and applying different types of device-level secure tokens to meters in a resource distribution network to control the access to the resource.

BACKGROUND

In the current advanced metering infrastructure (AMI), there are limited options for applying a payment to meters in a resource distribution network due to the complexity and the potential security issues associated with the payment mechanisms. Existing payment mechanisms rely on third-party services, such as third-party online payment services, that are separate from the metering network. The security of the payment mechanisms thus depends on the security mechanism implemented by the third party over which the utility company and the metering network has little control. Further, since the payment mechanisms are separate from the metering network, they are error-prone in that a payment might be applied to a different meter than the meter the payment was intended for.

In addition, the current AMI typically does not provide payment back-up features that consider situations where there are network infrastructure issues or a customer is unable to make a payment in time. In these situations, the customer's devices will be disconnected from the resource supply regardless of any special conditions the customer may be facing.

SUMMARY

Aspects and examples are disclosed for apparatuses and process for generating and applying payment-based tokens, time-based tokens, or global tokens to individual meters in a metering system. For instance, a system includes a headend system and a meter installed at a geographical location and in communication with the headend system through at least a mesh network. The headend system is configured for receiving a request to generate a time-based token for a meter. The request specifies a time duration for the time-based token. The headend system is further configured for generating the time-based token based on an identifier of the meter and the time duration, and transmitting the time-based token to the meter. The meter is configured for receiving the time-based token and validating the time-based token. Validating the time-based token includes determining that the time-based token is generated for the meter based on information related to the identifier of the meter. In response to determining that the time-based token is valid, the meter is further configured for connecting premises associated with the meter to a resource distribution network for at least the time duration specified in the time-based token.

In another example, a method includes receiving a time-based token by a meter. The meter is configured to control a connection of premises associated with the meter to a resource distribution network. The time-based token is generated based on an identifier of the meter and a time duration for which the premises is to be connected to the resource distribution network. The method further includes validating the time-based token, comprising determining that the time-based token is generated for the meter based on information related to the identifier of the meter. The method further includes in response to determining that the time-based token is valid, connecting the premises associated with the meter to a resource distribution network for at least the time duration associated with the time-based token.

In a further example, a method includes sending, by a headend system, provisioning data to a meter via at least a mesh network. The provisioning data is configured to cause the meter to operate in a mode for accepting time-based tokens. The meter is installed at a geographical location and configured to control a connection of premises at the geographical location to a resource distribution network. The method further includes receiving, by the headend system, a request to generate a time-based token for the meter with a time duration. The method also includes generating, by the headend system, the time-based token based on an identifier of the meter and the time duration, and transmitting, by the headend system, the time-based token to the meter over at least the mesh network. The time-based token is usable by the meter to connect or disconnect the premises from the resource distribution network based on the time duration associated with the time-based token.

These illustrative aspects and features are mentioned not to limit or define the presently described subject matter, but to provide examples to aid understanding of the concepts described in this application. Other aspects, advantages, and features of the presently described subject matter will become apparent after review of the entire application.

BRIEF DESCRIPTION OF THE FIGURES

These and other features, aspects, and advantages of the present disclosure are better understood when the following Detailed Description is read with reference to the accompanying drawings.

DETAILED DESCRIPTION

Figure 1:
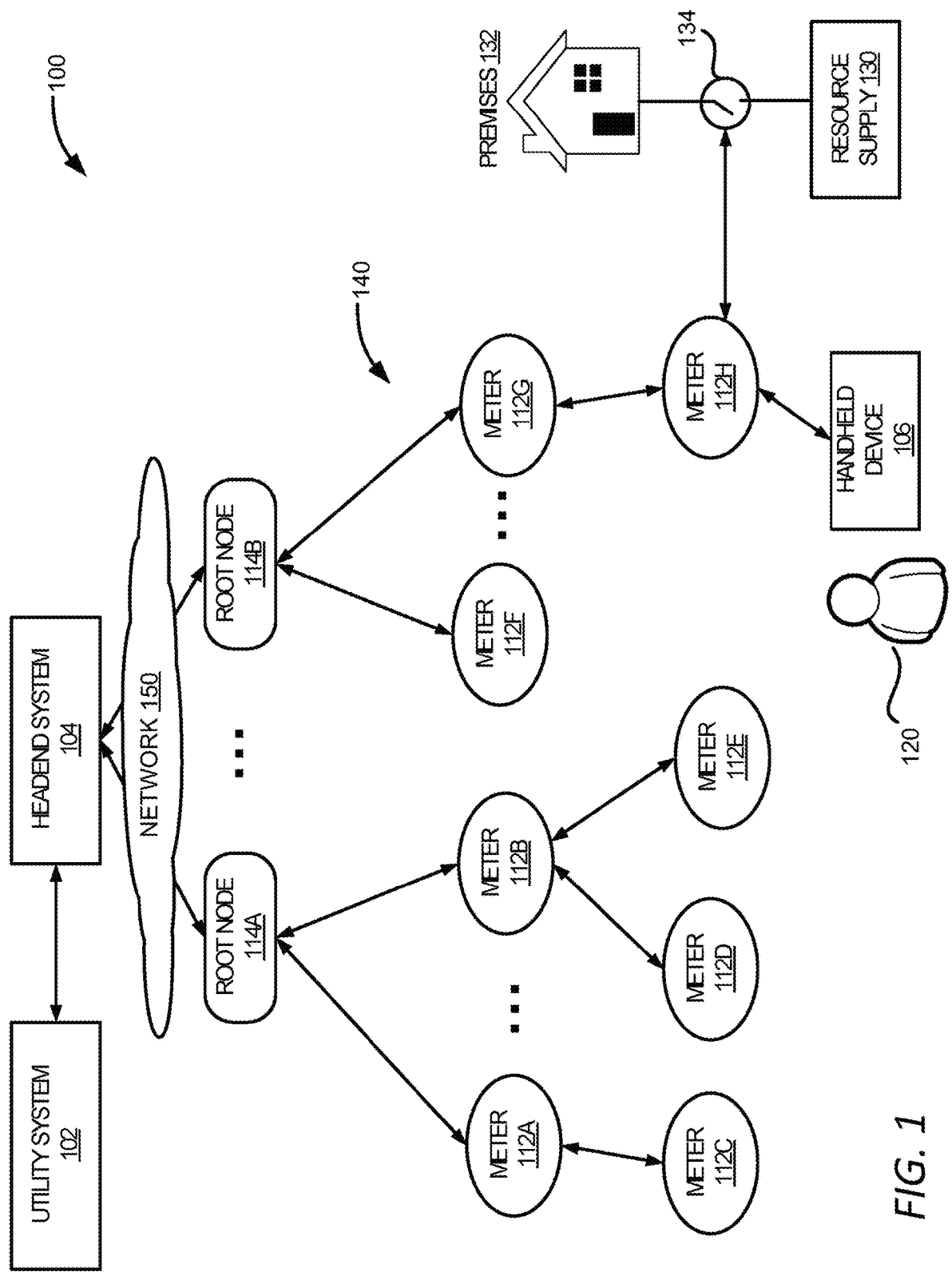
FIG. 1 is a block diagram showing an illustrative operating environment for generating and applying secure tokens at meters in a resource distribution network, according to certain examples of the disclosure.

Systems and methods are provided for generating and applying secure tokens at meters in a resource distribution network. The meters are configured to measure the resource consumption at their respective locations and are further in communication with a headend system via a mesh network. The headend system is configured to generate various types of secure tokens. The secure tokens can include payment-based tokens, time-based tokens or global tokens. A payment-based token is generated in response to a payment made for a specific meter and has a credit value corresponding to the payment. The payment-based token can be applied at a meter to update the balance associated with the meter, which determines whether the connection to a resource supply should be maintained or disconnected. A time-based token is generated in response to a request made for a specific meter and has a time duration associated therewith. The time-based token can be applied to a meter to extend the connection with a resource supply by the time duration specified in the time-based token. A global token is generated for a group of meters, rather than a specific meter, and also is associated with a time duration. The global token can also be applied at each meter in the group of meters to extend the connection with a resource supply by the time duration specified in the global token.

In some examples, the headend system is configured to generate a payment-based token in response to receiving a request to generate a payment-based token according to a payment made for a particular meter. The payment-based token has a credit value corresponding to the payment. The credit value is a value taken from a range spanned by a negative credit value limit and a positive credit value limit. The headend system generates the payment-based token based on an identifier of the particular meter, such as the serial number of the meter, so that the generated payment-based token is specific to the meter. The payment-based token also includes the credit value. The headend system is further configured to transmit the payment-based token to the particular meter over the mesh network. After receiving the payment-based token, the meter validates the payment-based token, such as by checking the integrity of the payment-based token, by verifying that the token is specific for the meter and by performing other operations. If the payment-based token is valid, the meter is configured to determine the balance associated with the meter based on the credit value specified in the payment-based token and connect or disconnect the resource supply at the location of the meter based on the balance associated with meter.

In other examples, the headend system is further configured to generate a time-based token in response to receiving a request to generate a time-based token for a particular meter. The time-based token has a time duration associated therewith, which might be requested by a user or selected by the headend system based on certain rules. The headend system generates the time-based token based on an identifier of the particular meter, such as the serial number of the meter, so that the generated time-based token is specific to the meter and cannot be applied at other meters. The headend system can transmit the time-based token to the particular meter over the network 150 and the mesh network. After receiving the time-based token, the meter validates the time-based token in a way similar to validating the payment-based token, such as checking the integrity of the time-based token, and verifying that the token is specific for the meter. If the time-based token is valid, the meter is configured to determine the time duration associated with the meter and connect the resource supply at the location of the meter for at least the time duration specified in the time-based token.

In further examples, the headend system is also configured to generate a global token that is applicable to multiple meters associated with a certain geographic area and managed by the headend system. For example, the headend system may generate the global tokens in response to a request by the utility company under a special or emergency situation, such as an extreme weather condition, where the mesh network and the headend system become unavailable. In one example, the global token has a time duration associated therewith. The global token can be distributed to users through a broadcast channel other than the mesh network, such as a radio network, a TV network, or other emergency communication mechanism, e.g. text messaging. Users of the meters can manually input the global token to their respective meters. After receiving the global token, a meter can determine the time duration specified by the global token and connect the resource supply at the location of the meter for the determined time duration.

Techniques described in the present disclosure increases the accuracy and security of the tokens applied in a resource distribution network. The payment-based tokens generated here are device-specific and only applicable to the specified meter. This reduces the chance of applying the payment on the wrong meter and also renders tokens intercepted by attackers useless. Furthermore, by configuring the headend system and the meters to generate and process multiple types of secure tokens, the flexibility of the resource distribution network has been significantly improved to allow it to handle different situations, including emergency situations. As a result, the meters in the distribution network do not need to switch modes for different situations, thereby reducing resource consumption, such as power, memory or computing resource, at the meters.

FIG. 1 shows an illustrative operating environment 100 for generating and applying secure tokens at meters in a resource distribution network. The environment 100 includes a mesh network 140 associated with the resource distribution network for delivering measurement data obtained by meters in the resource distribution network. The mesh network 140 includes multiple meters 112A-112H (which may be referred to herein individually as a meter 112 or collectively as the meters 112) deployed at various geographical locations. The meters 112 can be any type of meters in a utility network, such as electricity meters, gas meters, water meters, steam meters, etc. The meters 112 can be implemented to measure various operating characteristics of the resource distribution network, such as characteristics of resource consumption. For example, in a power distribution network, meters 112 can monitor and measure characteristics related to power usage in the network. Example characteristics related to power usage in the resource distribution network include average or total power consumption, power surges, power outages, and load changes.

The meters 112 transmit the collected data through the mesh network 140 to root nodes 114A and 114B (which may be referred to herein individually as a root node 114 or collectively as the root nodes 114). The root nodes 114 of the network 140 may be configured for communicating with the meters 112 to perform operations such as managing the meters 112, collecting data from the meters 112 and forwarding data to a headend system 104. A root node 114 can also be configured to function as a node to measure and process data itself. The root nodes 114 may be personal area network (PAN) coordinators, gateways, or any other devices capable of communicating with the headend system 104.

The root nodes 114 ultimately transmit the generated and collected meter data to the headend system 104 via another network 150 such as the Internet, an intranet, or any other data communication network. The headend system 104 can function as a central processing system that receives streams of data or messages from the root node 114. The headend system 104 can process or analyze the collected data. Based on the processed data, the headend system 104 further communicates with a utility system 102 associated with a utility company for various purposes, such as billing, performance analysis or troubleshooting. While FIG. 1 shows that the headend system 104 and the utility system 102 are separate systems, in some examples, they can be implemented in one system.

In some examples, a meter 112 can also be configured to control the connection of premises 132 at its geographical location or otherwise associated with the meter 112 to a resource supply 130 provided by the resource distribution network. For example, in a power distribution network, the meter 112 can be configured to control the status of a switch 134 in order to connect or disconnect the power supply of the resource network from the premises 132. In some implementations, a meter 112 controls the connection of the premises 132 with the resource supply 130 (i.e. the resource distribution network) based on the mode of the meter 112.

If the meter 112 is in a credit mode, the meter 112 continuously maintains the connection of the premises 132 to the resource supply 130 and measures the resource consumption at the premises 132. The meter 112 periodically sends the measured resource consumption along with other data to the headend system 104 which further forwards the data to the utility system 102 to generate bills for the user 120. If the meter 112 is in a pre-pay mode, the meter 112 controls the connection of the premises 132 to the resource supply 130 based on a credit balance associated with the meter 112 or a connection time duration specified for the meter 112. The meter 112 maintains the connection between the premises 132 and the resource supply 130 as long as the credit balance associated with the meter 112 is positive or exceeds a threshold balance value, or the connection time duration specified for the meter 112 is non-zero or exceeds a threshold duration value. If the balance associated with the meter 112 becomes negative or falls below the threshold balance value, or the connection time duration becomes zero, the meter 112 will control the switch 134 to disconnect the premises 132 from the resource supply 130. The balance or the connection time duration associated with a meter 112 can be adjusted by applying secure tokens to the meter 112. Additional details about the operations of the meter 112 in the pre-pay mode will be provided below with regard to FIGS. 2-12.

In further examples, the meter 112 might also be coupled with a handheld device 106 that is configured to display various information associated with the meter 112 and the characteristics related to the resource. In the example of a power distribution network, the handheld device 106 may be configured to show the power consumption at the premises 132, the status of the power connection (e.g. connected or disconnected), the mode of the meter (e.g. a pre-pay mode or a post-pay/credit mode), the balance associated with the meter if the meter is in a pre-pay mode, etc. The handheld device 106 is further configured to accept user input from a user 120 and transmit the user input to the meter 112. As will be discussed later with regard to FIGS. 2-12, the user input may include a secure token.

The handheld device 106 may be connected to the meter 112 in any wired or wireless manner. For example, the handheld device 106 can be connected to the meter 112 through a home area network (HAN). Non-limiting examples of suitable networking protocols for implementing a HAN include ZigBee, Bluetooth, Wi-Fi, and the like. Non-limiting examples of a HAN include a HomePlug network implemented via power line communications, a Multimedia over Coax Alliance ("MoCA") network providing network connectivity between appliances and networking devices implemented via coaxial cable, a HomePNA Alliance network, etc.

It should be appreciated that while FIG. 1 depicts a specific network topology (e.g., a DODAG tree), other network topologies are also possible (e.g., a ring topology, a mesh topology, a star topology, etc.). In addition, although the following description will focus on the aspects of one meter 112, the technologies described herein can be applied by any meter in the mesh network, including the meters 112 and the root node 114 as long as the meter can control the access to a power source.

Figure 2:
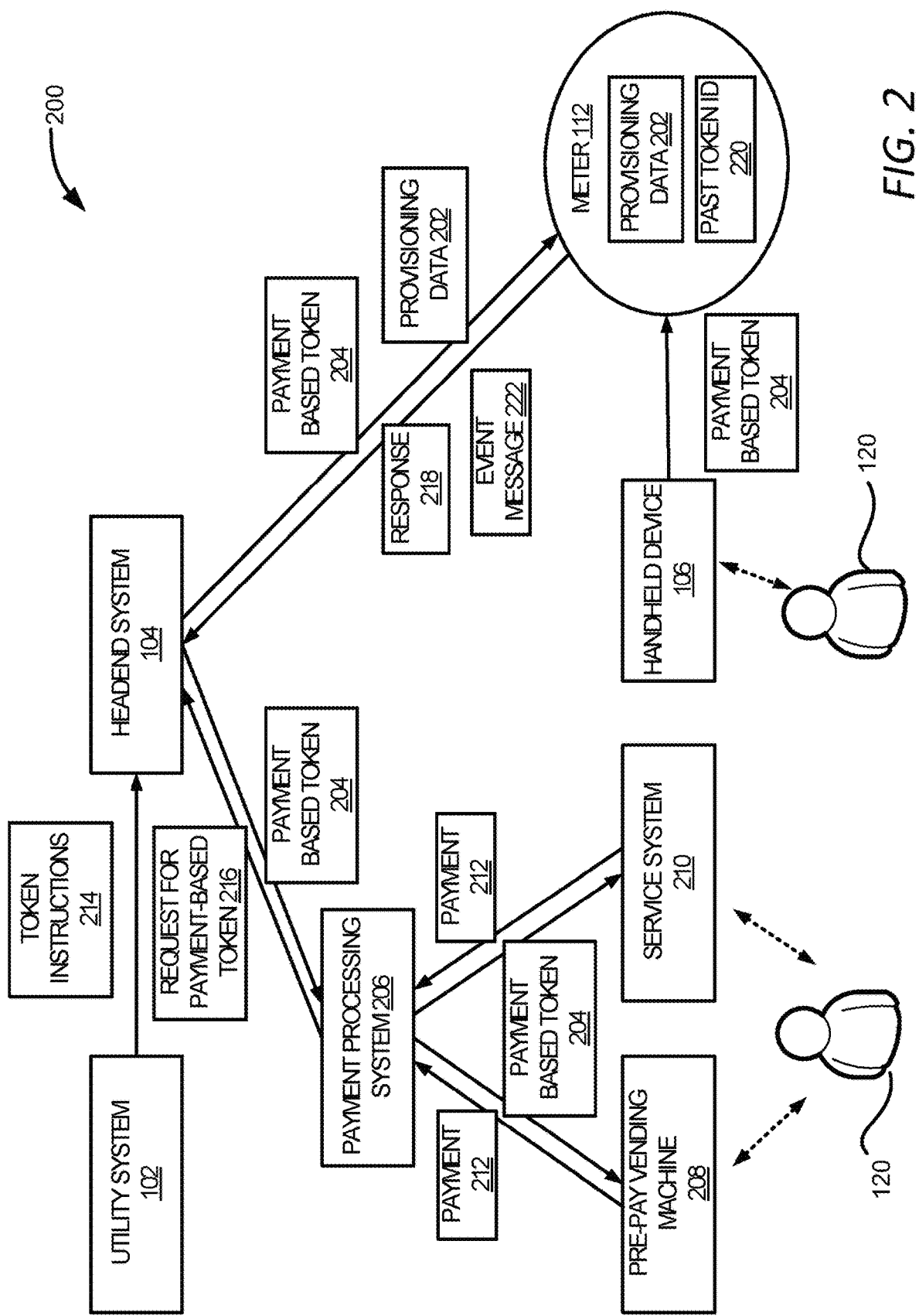
FIG. 2 is a diagram showing an illustrative operating environment for generating and applying payment-based tokens at meters in a resource distribution network, according to certain examples of the disclosure.

FIG. 2 is a diagram showing an illustrative operating environment 200 for generating and applying payment-based tokens at meters in a resource distribution network, according to certain examples of the disclosure. The environment 200 includes the utility system 102, the headend system 104, and a meter 112 as discussed above with regard with FIG. 1. The environment 200 further includes a payment processing system 206, a pre-pay vending machine 208 or a service system 210.

The pre-pay vending machine 208 is an automated machine that allows a user 120 to make payment 212 toward a certain meter 112. Multiple pre-pay vending machines 208 can be deployed in the geographical areas where the resource distribution network is deployed so that users 120 can make payments for the meters at their respective locations. The service system 210 includes computing systems hosted by, for example, the utility company or a third-party entity that allows users 120 to make payments 212. For instance, the service system 210 may be configured to provide a website or a telephone service through which the user 120 can make payment 212.

The payment processing system 206 is configured to receive the payment 212, verify the payment 212, and inform the headend system 104 or the utility system 102 regarding the payment 212. The payment processing system 206 may be associated with a financial institution, such as a bank or a credit union to process or verify the payment 212. Alternatively, or additionally, the payment processing system 206 may be associated with the headend system 104 or the utility system 102 and further in communication with a financial institution to process the payment 212. The payment 212 may be made using cash, check, credit card, debit card, and others.

In order for the meters 112 in the resource distribution network to accept and process secure tokens, including payment-based tokens, time-based tokens, and global tokens, the headend system 104 is configured to first provision the meters 112 to switch their modes to the prepay mode. In some examples, the provisioning is performed by the headend system 104 transmitting provisioning data 202 to the meters 112 that are to be switched to the prepay mode. The provisioning data 202 sent to a meter 112 can include a secret key used by the meter 112 to validate secure tokens received at the meter 112. The provisioning data 202 can further include other parameters that are used by the meter 112 to determine if a secure token is valid or not. For instance, the provisioning data 202 may include token acceptance parameters for determining an acceptable window for the secure tokens. An acceptable window defines a range of serial numbers for acceptable secure tokens. If the serial number of a received secure token falls within this range, the secure token can be accepted at the meter 112; otherwise, the meter 112 will reject the secure token. Additional details about validating a secure token are provided below with regard to FIG. 9. As will be discussed later with regard to FIGS. 10-12, the provisioning data 202 can also include data used by the meter 112 for processing global tokens, such as a global token table enumerating acceptable global tokens.

After receiving the provisioning data 202, the meter 112 switches its mode to prepay mode and stores the provisioning data 202 locally. In some implementations, the meter 112 is also configured to send a provisioning response to the headend system 104 to inform the headend system 104 that the meter 112 has successfully switched to the prepay mode and is functioning properly under that mode. In another example, the meter 112 is set to the pre-pay mode upon installation. The meter 112 then receives the provisioning data 202 from the headend system 104 during an initial communication with the headend system 104.

It should be noted that switching the mode of a meter 112 to the prepay mode can be requested by the utility company at the request of the user of the meter 112 or based on its own decision. The utility company can include the request to switch the mode of certain meters 112 in the token instructions 214 and send the request to the headend system 104 through the utility system 102. Based on the request, the headend system 104 determines the list of meters 112 to be switched and provisions each of these meters as discussed above. In some examples, for security reasons, the secret key included in the provisioning data 202 is different from the secret key for other meters 112 and is also different from the keys used for the communication between the meter 112 and the headend system 104. Other parameters contained in the provisioning data 202, such as the token acceptance parameters, may be the same or different for different meters 112.

Once the meter 112 is provisioned and switched to the prepay mode, the meter 112 can accept and process secure tokens. In the example shown in FIG. 2, the meter 112 can accept and process payment-based tokens. Other types of secure tokens, such as the time-based tokens and the global tokens, are discussed below with regard to FIGS. 6-12. In the example shown in FIG. 2, a user 120 can make a payment 212 for a meter 112 using the pre-pay vending machine 208 or the service system 210 as discussed above with regard to FIG. 1 or through other mechanisms. Upon receiving the payment 212, the payment processing system 206 verifies that the payment 212 is a valid payment. For example, the payment processing system 206 may verify that the bank account or a credit card account used in the payment is a real account and the user 120 is an authorized user to charge the payment to the account. The payment processing system 206 will notify the user 120 if the verification process fails.

If the payment processing system 206 determines that the payment 212 is valid, the payment processing system 206 generates and sends a request for payment-based token 216 to the headend system 104. The request for payment-based token 216 can include information such as an identifier of the meter for which the payment-based token is to be generated, the amount of the payment 212 (also referred to herein as the "credit value" of the payment 212), whether the payment is positive or negative, and other information. Positive payment occurs when the payment processing system 206 determines that positive credit value is to be added to the account associated with the meter 112, e.g. when the user 120 adds X dollars to his account that is associated with the meter 112. Negative payment occurs when the payment processing system 206 determines that a certain credit value should be deducted from the account associated with the meter 112. The negative payment can be utilized, for example, to correct a positive payment previously made by mistake, to cancel a credit value adjustment made temporarily, to issue a refund to the user, and so on.

Figure 3:
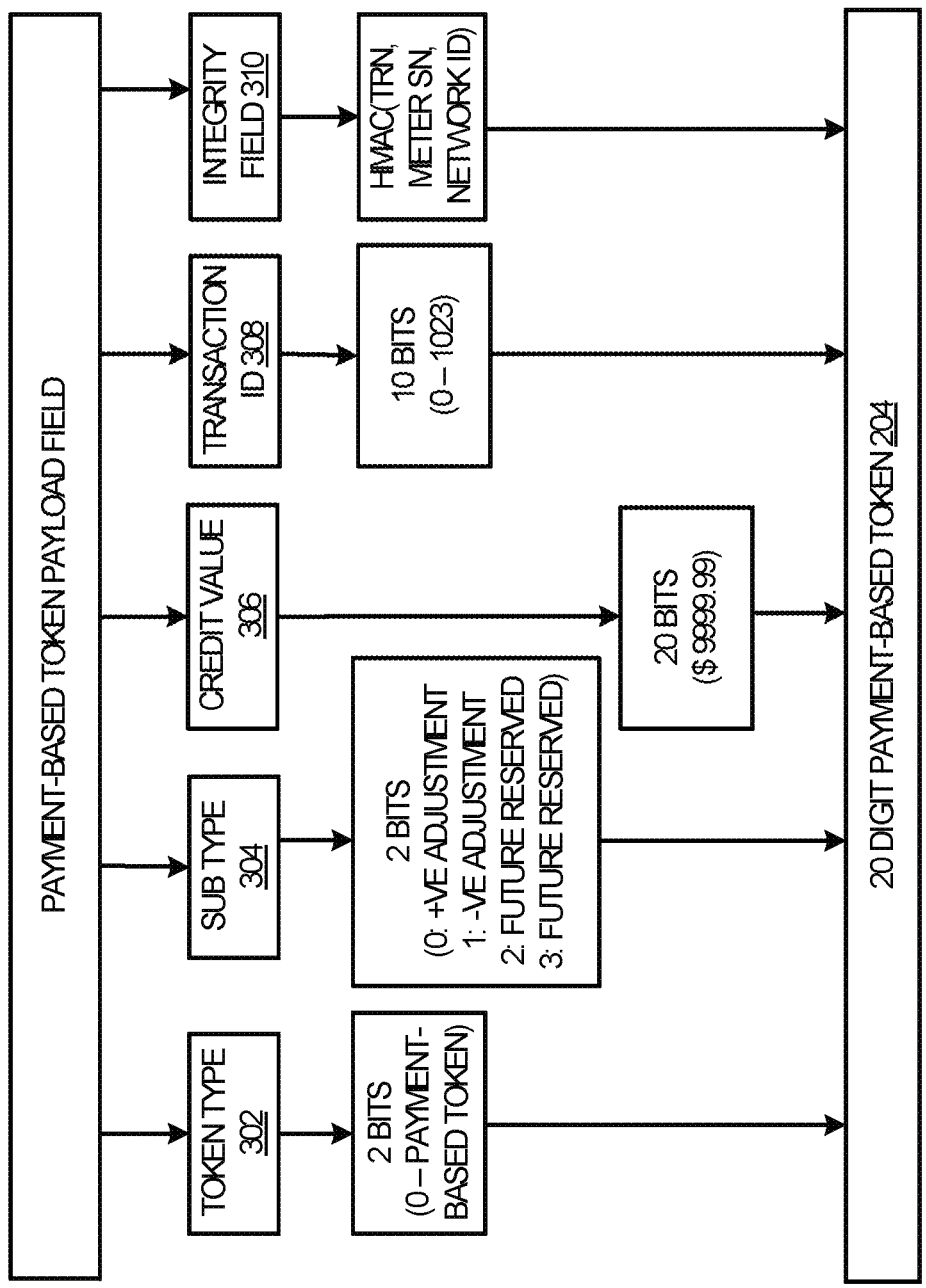
FIG. 3 shows an example of a payment-based token generated by a headend system and to be applied at a meter in a resource distribution network, according to certain examples of the disclosure.

Based on the request for payment-based token 216, the headend system 104 generates a payment-based token 204. The payment-based token 204 is generated based on information such as the type of the token, the credit value associated with the token, the serial number of the token, the meter for which the token is generated, and so on. These types of information may be explicitly included in one or more fields of the payment-based token 204 or may be transformed before being included in the payment-based token 204. FIG. 3 shows an example of a payment-based token 204 generated by the headend system 104 according to certain examples of the disclosure.

In the example shown in FIG. 3, a payment-based token 204 contains 66 bits which is equivalent to 20 decimal digits. The first two bits of the payment-based token 204 are used to represent the token type 302. In some examples, if the value of the token type 302 is 0, then the token is a payment-based token. Other values of the token type 302 can be used to indicate other types of secure tokens. The next two bits of the payment-based token 204 shown in FIG. 3 indicate the sub-type 304 of the token, and the following 20 bits represent a credit value 306 which ranges from 0-10,000 U.S. dollars or another currency.

In some examples, if the sub-type 304 has a value 0, then the token 204 represents a positive adjustment of credit value; and if the sub-type 304 has a value 1, then the token 204 represents a negative adjustment of credit value. In other words, if the sub-type 304 shows a positive adjustment, then the amount represented by the credit value 306 will be added to the account associated with the meter 112. If the sub-type 304 shows a negative adjustment, then the amount represented by the credit value 306 will be deducted from the account associated with the meter 112.

The payment-based token 204 shown in FIG. 3 further includes a field of transaction ID 308 that contains 10 bits. In some examples, the transaction ID 308 represents the least significant 10 bits of a full token reference number (TRN). The TRN is a binary number uniquely representing the sequential token number for the meter 112. After an initial starting value, each token generated for the meter 112 will have a monotonically increasing sequential TRN. In some examples, the TRN is a 32-bit number between 0 and 4294967295 and the transaction ID 308 represents the least significant 10 bits of this 32-bit number.

The payment-based token 204 shown in FIG. 3 also includes an integrity field 310 which is uniquely calculated by using a cryptography tool, such as the hash-based message authentication code (HMAC). The integrity field 310 can be generated by applying the cryptography tool to encrypt data such as fields 302-308 of the payment-based token 204, the serial number of the meter 112, the network ID of the meter 112, and information that is unique to the token within the resource distribution network, such as the TRN of the token. In some examples, the headend system 104 generates the HMAC using a hash function such as the secure hash algorithm SHA-256 based on the secret key that is included in the provisioning data 202. In this way, the meter 112 can, after receiving the payment-based token 204, use the same secret key to generate the HMAC and compare the generated HMAC with that included in the integrity field 310 of the received payment-based token 204 to validate the token 204. It should be understood that cryptography tools other than HMAC and SHA-256 can also be used to generate the integrity field 310.

Referring back to FIG. 2, after the headend system 104 generates the payment-based token 204, the headend system 104 can send the payment-based token 204 back to the payment processing system 206 or another system which may forward it to the pre-pay vending machine 208 or the service system 210 so that the user 120 can obtain a copy of the payment-based token 204. Alternatively, the payment-based token 204 may directly send the payment-based token 204 to the pre-pay vending machine 208 or the service system 210 to provide a copy of the payment-based token 204 to the user 120. In some examples, the payment-based token 204 may be included in an acknowledgment of the payment 212 sent to the user 120, such as in a receipt of the payment 212.

In some implementations, when submitting the payment 212 at the pre-pay vending machine 208 or at the service system 210, the user 120 is also asked whether the user wants to have the generated payment-based token 204 automatically applied to the meter 112. The decision made by the user 120 in this regard can be included in the request for payment-based token 216 so that the headend system 104 can act accordingly. If the user 120 agrees to the automatic application of the payment-based token 204 to the meter 112, the headend system 104 sends the payment-based token 204 to the meter 112 via the mesh network 140. If the user 120 does not agree to the automatic application of the payment-based token 204, the headend system 104 will not send the payment-based token 204 to the meter 112. In some examples, the user 120 may choose to allow the headend system 104 to automatically apply the payment-based token 204 to the meter 112, but with a certain amount of delay. In those examples, the headend system 104 waits for the specified amount of time duration, and then sends the payment-based token 204 to the meter 112 over the mesh network 140.

Instead of relying on the headend system 104 to apply the payment-based token 204, the user 120 may input the payment-based token 204 using the handheld device 106 associated with the meter 112. In other words, the user 120 can decline the automatic application of the payment-based token 204 by the headend system 104 and input the payment-based token 204 he or she received after making the payment 212 through the handheld device 106. In these examples, the handheld device 106 is configured to present a user interface that allows the user 120 to enter the payment-based token 204 and to transmit the payment-based token 204 to the meter 112.

Upon receiving the payment-based token 204, either from the handheld device 106 or from the headend system 104, the meter 112 starts to validate the payment-based token 204. The meter 112 can parse the payment-based token 204 to determine each of the fields contained in the payment-based token 204. The meter 112 further uses the secret key contained in the provisioning data 202 to generate an authentication code, such as the HMAC, based on the same information that is used by the headend system 104 to generate the integrity field 310. The information can include, for example, the serial number of the meter, the network ID of the meter, the TRN and the other fields of the payment-based token 204, i.e. the token type 302, the sub-type 304, the credit value 306 and the transaction ID 308. If the generated authentication code matches the integrity field 310 of the payment-based token 204, the meter 112 can determine that the payment-based token 204 is generated by the headend system 104 and the content of the payment-based token 204 has not been altered.

By including the identifier of the meter 112, such as the serial number and the network ID of the meter 112, in the input for generating the HMAC for the integrity field 310, the generated payment-based token 204 is tied to the intended meter 112. As a result, if the payment-based token 204 is received by a different meter, that meter will be able to determine that the payment-based token 204 is not intended for it by determining that its calculated HMAC does not match the integrity field 310 and subsequently discard the payment-based token 204. In this way, it can be ensured that the payment-based token 204 is applied at the correct meter 112.

In further examples, the meter 112 is also configured to determine if the transaction ID of the received payment-based token 204 is within an acceptable window. As briefly discussed above, the acceptable window can be determined based on the token acceptance parameters included in the provisioning data 202. Further details of determining the acceptable window and determining whether the payment-based token 204 is within the acceptable window are provided below with regard to FIG. 9.

In some examples, the meter 112 may also be configured to determine if the received payment-based token 204 is a duplicate token that has been received and processed before. In these examples, the meter 112 is configured to store the tokens or the tokens identifier (ID) 220, such as the TRNs, that the meter 112 received and processed in the past. If the current payment-based token 204 matches any of the past token IDs 220, the meter 112 can determine that the received payment-based token 204 is a duplicate and is not a valid token.

If the meter 112 determines that the received payment-based token 204 is a valid token, the meter 112 applies the credit value 306 to the balance of an account associated with the meter 112 according to the sub-type 304 specified in the payment-based token 204. For example, if the sub-type 304 specifies that the token is for a negative adjustment, the meter 112 reduces the balance of the account by the credit value 306; if the sub-type 304 specifies that the token is for a positive adjustment, the meter 112 increases the balance of the account by the credit value 306. Based on the balance of the account after the adjustment, the meter 112 can connect or disconnect the premises 132 from the resource supply 130. In other words, if after the adjustment, the balance associated with the meter 112 is changed from negative to positive (or from below a threshold balance to above the threshold balance), the meter 112 will connect the resource supply 130 to the premises 132, e.g. by closing the switch 134. If the balance associated with the meter 112 is changed from positive to negative (or from above the threshold balance to below the threshold balance), the meter 112 will disconnect the resource supply 130 from the premises 132, e.g. by opening the switch 134. If after the adjustment, the balance associated with the meter 112 remains positive or above the threshold balance (or negative or below the threshold balance), the meter 112 will maintain the connection (or the disconnection) between the premises 132 and the resource supply 130 (i.e. the resource distribution network).

Whenever the premises 132 are connected to the resource supply 130, the meter 112 measures the resource consumption at the premises 132 and updates the balance associated with the meter 112 based on resource consumption. For example, the meter 112 can convert the resource consumption to a monetary value based on the rate at the time when the resource is consumed. The meter 112 then reduces the balance associated with the meter by the converted monetary amount. The meter 112 disconnects the premises 132 from the resource supply 130 once the balance becomes negative or below the threshold balance and will reconnect if a new token is received resulting in a positive balance or above the threshold balance.

Depending on where the meter 112 receives the payment-based token 204, the meter 112 will generate and transmit a token application response 218 or an event message 222 to the headend system 104. If the payment-based token 204 is received from the headend system 104, the meter 112 generates a token application response 218 to report the status of the payment-based token 204 received at the meter 112. In some implementations, the token application response 218 includes the status of the payment-based token 204. The status of the payment-based token 204 might include, for example, "token has been applied successfully at the meter," "token is rejected because it is outside the acceptable window," "token is rejected because it is a duplicate," "token is rejected because it failed integrity check," and so on.

The token application response 218 can further include other information, such as the credit value applied to the meter 112, the balance associated with the meter 112 after the payment-based token 204 is applied, the status of the meter switch 134 (e.g. open/disconnected or closed/connected). The token application response 218 may also include the payment-based token 204 or the serial number of the payment-based token 204, such as the TRN or the transaction ID. The token application response 218 may be sent along with other data sent from the meter 112 to the headend system 104, such as the collected meter data, or sent separately.

If the payment-based token 204 is received through the handheld device 106, the meter 112 generates and transmits an event message 222 containing the payment-based token 204 to the headend system 104 to report the payment-based token 204. The event message 222 may also include other data, such as the status of the payment-based token 204, the status of the meter switch 134 or any other data that is included in the token application response 218. Similar to the token application response 218, the event message 222 can be sent to the headend system 104 along with other data, such as the collected meter data, or sent separately.

Upon receiving the event message 222, the headend system 104 analyzes the payment-based token 204 to determine whether the payment-based token 204 included in the event message 222 is generated by the headend system 104, such as by searching in the past tokens generated by the headend system 104. The headend system 104 is then configured to send the analysis results to the meter 112. If the analysis results show that the payment-based token 204 is not generated by the headend system 104, the meter 112 can readjust the balance associated with the meter 112 to remove the credit value of the payment-based token 204. The meter 112 may also cause the handheld device 106 to display a warning message to indicate the analysis results and the actions carried out by the meter 112 based on the analysis results.

Figure 4:
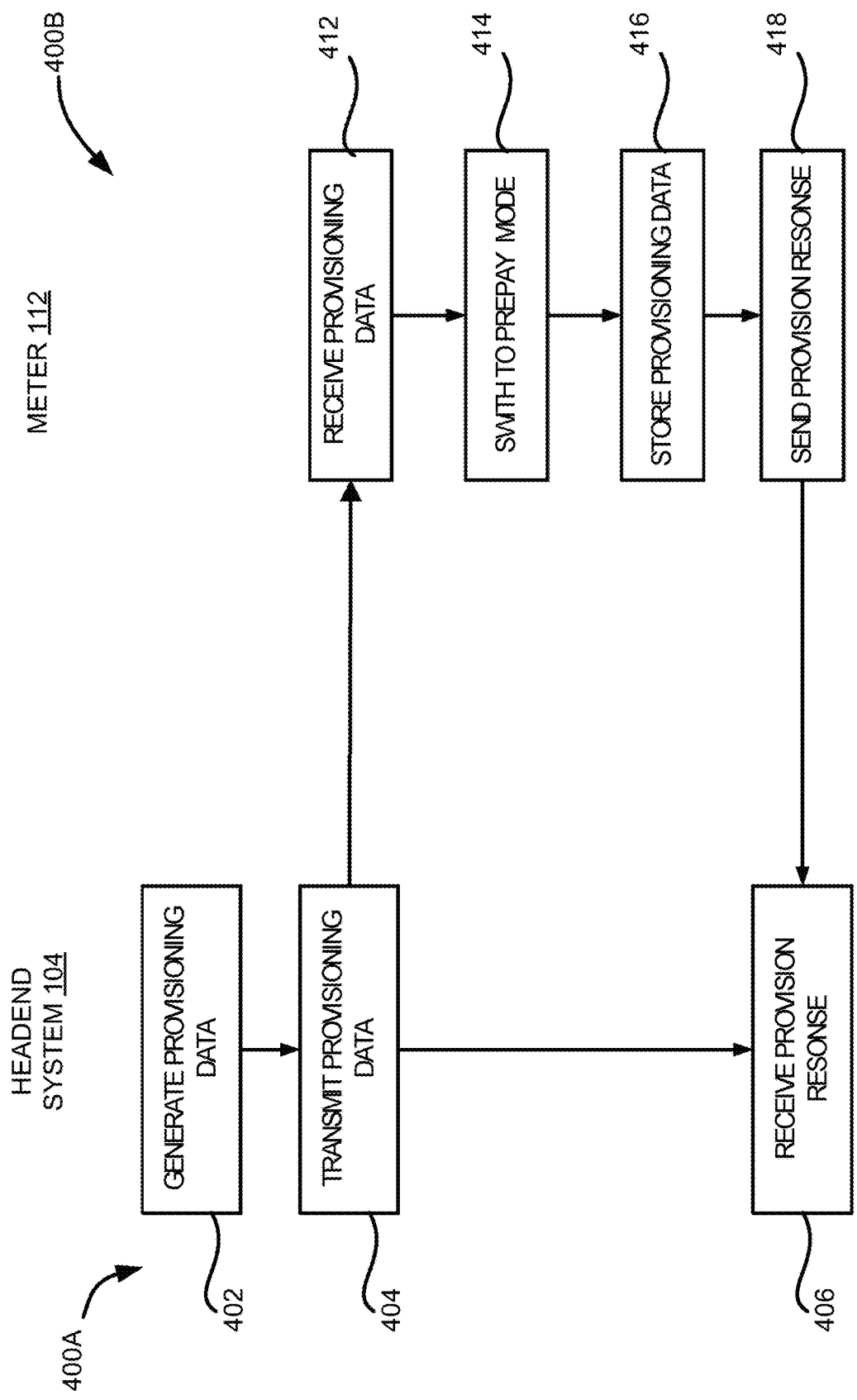
FIG. 4 shows an example of processes for provisioning a meter so that secure tokens can be accepted and applied at the meter in a resource distribution network, according to certain examples of the disclosure.

FIG. 4 shows an example of processes for switching a meter 112 to a prepay mode and for provisioning the meter 112 so that secure tokens can be applied at the meter 112 in a resource distribution network, according to certain examples of the disclosure. In particular, FIG. 4 includes process 400A that illustrates aspects of the headend system 104, and process 400B that illustrates aspects of the meter 112. The processes 400A and 400B will be described together below.

At block 402, the process 400A involves the headend system 104 generating the provisioning data 202. As discussed above with regard to FIG. 2, the provisioning data 202 can include a secret key used by the meter 112 to validate secure tokens received at the meter 112. The provisioning data 202 can further include other parameters that are used by the meter 112 to determine the validity of a received secure token. For instance, the provisioning data 202 may include token acceptance parameters for determining an acceptable window for the secure tokens. The provisioning data 202 may further include a global token table listing the acceptable global tokens. In some examples, the provisioning data 202 may also include an explicit instruction to ask the meter 112 to switch to a prepay mode. At block 404, the headend system 104 transmits the provisioning data 202 to the meter 112 via the mesh network 140.

At block 412, the process 400B involves the meter 112 receiving the provisioning data 202. At block 414, the meter 112 switches to the prepay mode, for example, by setting its mode to the prepay mode and loading firmware corresponding to the prepay mode for execution. At block 416, the meter 112 stores the provisioning data 202 in memory or other storage device accessible by the meter 112. At block 418, the meter 112 sends a provisioning response to the headend system 104 to acknowledge the receipt of the provisioning data 202 and the mode switch of the meter 112.

At block 406, the headend system 104 receives the provisioning response, and the provisioning process ends.

It should be understood that although the above example describes that the provisioning is performed when the meter 112 is switched from a credit mode to a prepay mode, the provisioning may be performed even after the meter 112 has switched to the prepay mode. For instance, the provisioning process may be performed whenever the headend system 104 decides to update the secret key for validating the secure tokens, the token acceptance parameters, or the global token table. In those cases, block 414 may be skipped.

Figure 5:
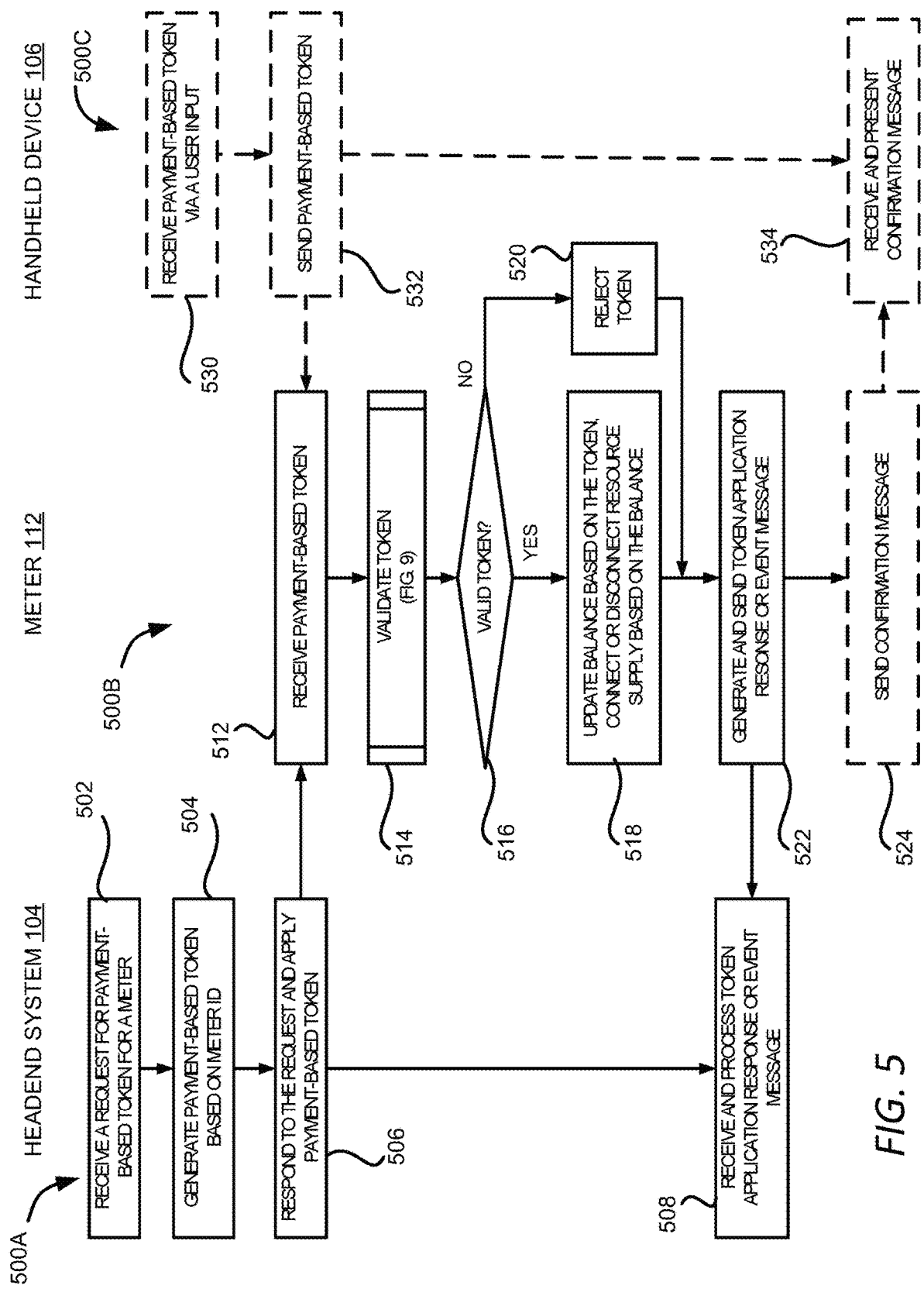
FIG. 5 shows an example of processes for generating and applying a payment-based token at a meter in a resource distribution network, according to certain examples of the disclosure.

FIG. 5 shows an example of processes for generating and applying a payment-based token 204 at a meter 112 in a resource distribution network, according to certain examples of the disclosure. In particular, FIG. 5 includes processes 500A, 500B and 500C. The process 500A illustrates aspects of the headend system 104. The process 500B illustrates aspects of the meter 112. The process 500C illustrates the aspects of the handheld device 106. The processes 500A, 500B, and 500C will be described together below.

The process 500A begins at block 502 where the headend system 104 receives a request for payment-based token 216 for a meter 112. As discussed above with regard to FIG. 2, the request for payment-based token 216 might be generated by the payment processing system 206 in response to a payment 212 made by a user 120 for the meter 112. The request for payment-based token 216 might be also generated by the payment processing system 206 to adjust the balance associated with the meter 112 to, for example, correct an error, issue a refund, cancel a temporary adjustment, and so on. As such, the requested payment-based token 204 can be a positive adjustment or a negative adjustment.

At block 504, the process 500A involves generating a payment-based token 204 for the meter 112. In order to make the payment-based token 204 specific to the meter 112, the payment-based token 204 is generated based on an identifier of the meter 112, such as the serial number of the meter 112, the network ID of the meter 112, or a combination of these. In addition, the generated payment-based token 204 also includes or is based on a serial number unique to the payment-based token 204 in the mesh network 140. The payment-based token 204 also indicates the credit value associated with the token and the type of adjustment, such as negative adjustment or positive adjustment. In one example, the payment-based token 204 is generated according to the format shown in FIG. 3, which includes a token type, a sub-type, a credit value, a transaction ID of the token and an integrity field. In some implementations, the integrity field is generated using a secret key to generate an HMAC based on one or more fields 302-308 of the payment-based token 204, the identifier of the meter 112, such as the serial number and the network ID, and the TRN of the payment-based token 204.

At block 506, the process 500A involves responding to the request for payment-based token 216 with the generated payment-based token 204. For example, the headend system 104 sends the payment-based token 204 to the entity that requested the payment-based token 204, such as the payment processing system 206, so that the payment-based token 204 can be forwarded to the user 120. In another example, the headend system 104 sends the payment-based token 204 directly to the system where the user 120 made the payment, such as the pre-pay vending machine 208 or the service system 210.

If the user 120 authorizes the headend system 104 to automatically apply the generated payment-based token 204 to the meter 112, block 506 further involves applying the payment-based token 204 to the meter 112 by sending the payment-based token 204 to the meter 112. The application of the payment-based token 204 to the meter 112 may be performed immediately or with a certain delay, depending on the selection made by the user 120 when providing the authorization to the headend system 104 to apply the payment-based token 204.

If the user 120 does not authorize the headend system 104 to apply the payment-based token 204 to the meter 112, the user 120 can manually input the payment-based token 204 using the handheld device 106. At block 530, the process 500C involves receiving the payment-based token 204 at the handheld device 106 through user input. At block 532, the process 500C involves sending the received payment-based token 204 to the meter 112 through, for example, a HAN.

At block 512, the process 500B involves the meter 112 receiving the payment-based token 204, either from the headend system 104 or from the handheld device 106. At block 514, the process 500B involves validating the payment-based token 204 to determine if the received payment-based token 204 is a valid token. The validation process might include for example, determining the integrity of the payment-based token 204, determining that the payment-based token 204 is generated for the meter 112, determining that the token is within the acceptable window, determining the token is not a duplicate token, and so on. Additional details regarding validating the payment-based token 204 are provided below with regard to FIG. 9.

At block 516, the process 500B involves determining whether the payment-based token 204 is a valid token. If not, the process 500B involves rejecting the payment-based token 204 at block 520. If the payment-based token 204 is a valid token, the process 500B involves, at block 518, updating the balance associated with the meter 112 based on the payment-based token 204 and connecting or disconnecting (or maintaining a connected or disconnected state with) the resource supply based on the balance. If the payment-based token 204 indicates a negative adjustment, the meter 112 reduces the balance of the meter 112 by the credit value specified in the payment-based token 204. If the payment-based token 204 indicates a positive adjustment, the meter 112 increases the balance of the meter 112 by the credit value specified in the payment-based token 204. If the updated balance is positive (or above a threshold balance), the meter 112 connects or maintains a connection between the premises 132 to the resource supply 130. If the updated balance is negative (or below the threshold balance), the meter 112 disconnects or maintains a disconnected state between the premises 132 and the resource supply 130.

At block 522, the process 500B involves sending a token application response 218 as discussed above with regard to FIG. 2, if the payment-based token 204 is received from the headend system 104. In some implementations, the token application response 218 includes information such as the status of the payment-based token 204 (such as accepted or rejected), the credit value applied to the meter 112, the balance associated with the meter 112 after the payment-based token 204 is applied, the status of the meter switch 134 (e.g. open/disconnected or closed/connected), or any combination thereof. The token application response 218 may also include the payment-based token 204 or the serial number of the payment-based token 204, such as the TRN or the transaction ID.

If the payment-based token 204 is received from the handheld device 106, the meter 112 generates and sends an event message 222 to the headend system 104 to inform the headend system 104 about the received payment-based token 204 and request the headend system 104 to verify the payment-based token 204. The event message 222 may contain similar content as the token application response 218, such as the status of the payment-based token 204 (such as accepted or rejected), the credit value applied to the meter 112, the balance associated with the meter 112 after the payment-based token 204 is applied, the status of the meter switch 134 (e.g. open/disconnected or closed/connected). The event message 222 also includes the entire payment-based token 204 and an indication of a request for the headend system 104 to verify the authenticity of the payment-based token 204. As discussed above with regard to FIG. 2, the token application response 218 or the event message 222 may be sent along with the meter data collected at the meter 112 or sent separately to the headend system 104.

The headend system 104 receives the token application response 218 or the event message 222 at block 508 and processes the received message accordingly. For example, if the headend system 104 receives an event message 222, the headend system 104 verifies the payment-based token 204 contained in the event message 222 to determine if the payment-based token 204 was indeed generated by the headend system 104. The headend system 104 notifies the meter 112 about the verification results, for example, by sending a notification to the meter 112. The meter 112 can take actions according to the verification results, such as canceling the payment-based token 204 applied at the meter 112 if the payment-based token 204 is not generated by the headend system 104.

If the payment-based token 204 is received from the handheld device 106, the process 500B further involves the meter 112 sending a confirmation message to the handheld device 106 at block 524. The confirmation message can include, for example, the status of the payment-based token 204 (e.g. accepted or rejected), the credit value applied to the meter 112, the balance associated with the meter 112 after the payment-based token 204 is applied, the status of the meter switch 134 (e.g. open/disconnected or closed/connected). The handheld device 106 receives the confirmation message at block 534 and presents it to the user 120 in a user interface.

In the prepay mode, a meter 112 is generally configured to disconnect the premises 132 from the resource supply 130 if the balance associated with the meter 112 is below zero or below a threshold balance value. The user 120 of the premises 132 needs to make timely payment and have the payment-based token applied at the meter 112 in order not to be disconnected from the resource supply 130. In some scenarios, it is impossible or inconvenient for the user 120 to make a payment due to the time and the location of the user 120. In those scenarios, the user 120 can request a time-based token to extend the connection with the resource supply 130 for a certain time duration and make a payment at a later time.

Figure 6:
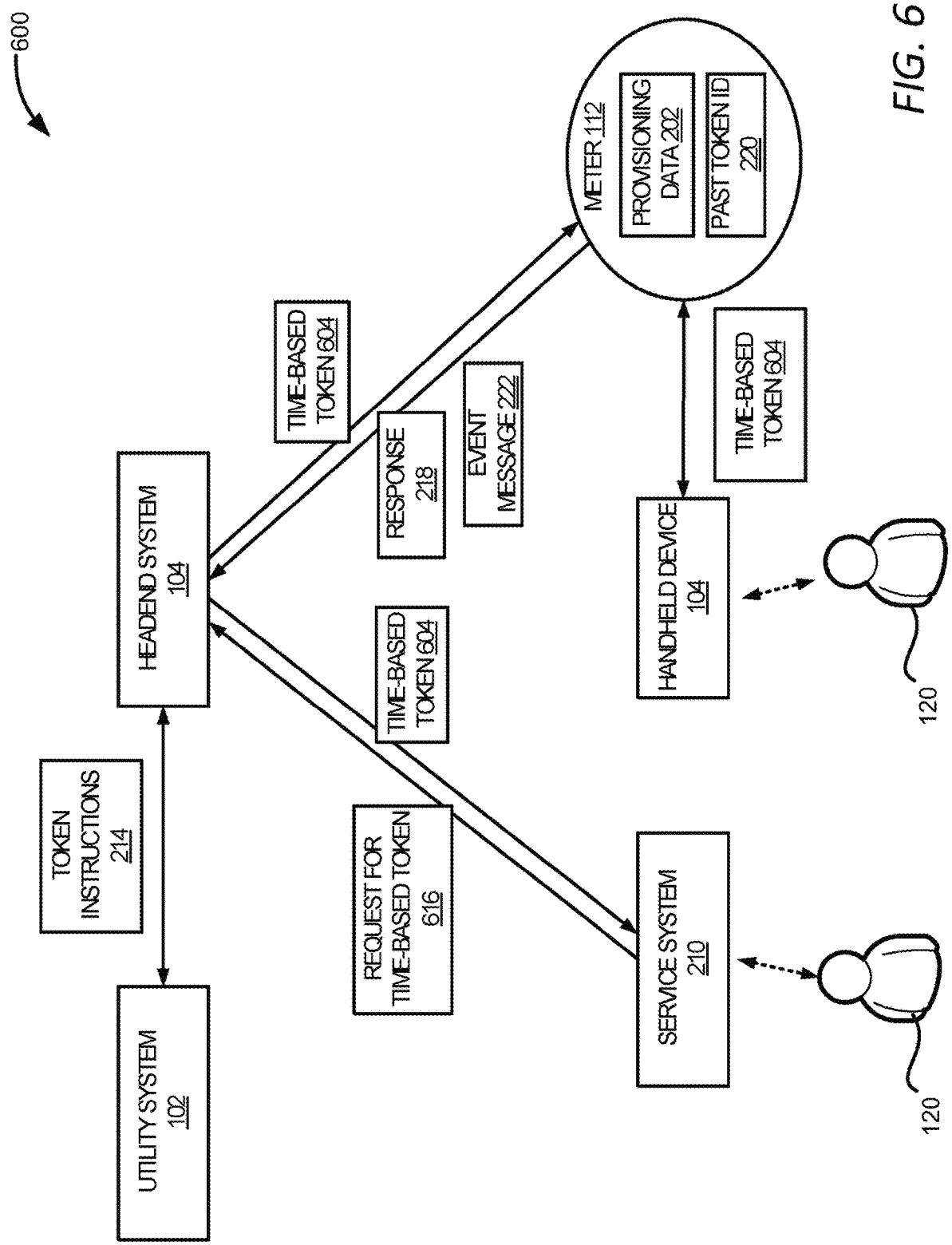
FIG. 6 is a diagram showing an illustrative operating environment for generating and applying time-based tokens at meters in a resource distribution network, according to certain examples of the disclosure.

FIG. 6 is a diagram showing an illustrative operating environment 600 for generating and applying time-based tokens at meters in a resource distribution network, according to certain examples of the disclosure. The environment 600 includes the utility system 102, the headend system 104, meters 112, and the service system 210 as discussed above with regard with FIGS. 1 and 2. As discussed before, the service system 210 includes computing systems hosted by, for example, the utility company or a third-party entity to allow users 120 to make payments 212. Additionally, or alternatively, the service system 210 can also be configured to allow users 120 to request time-based tokens. For instance, the service system 210 may provide a website or a telephone service through which the user 120 can request time-based tokens.

Upon receiving the request from the user 120, the service system 210 can generate and transmit a request for time-based token 616 to the headend system 104. The request for time-based token 616 can include data such as the identifier of the meter 112 for which the time-based token is to be generated, the time duration associated with the time-based token, the starting date of the duration, etc. In other examples, the payment processing system 206 might communicate with the utility system 102. The utility system 102 can then communicate with the headend system 104 to request the time-based token to be generated, such as by sending the request for time-based token 616 to the headend system 104.

Figure 7:
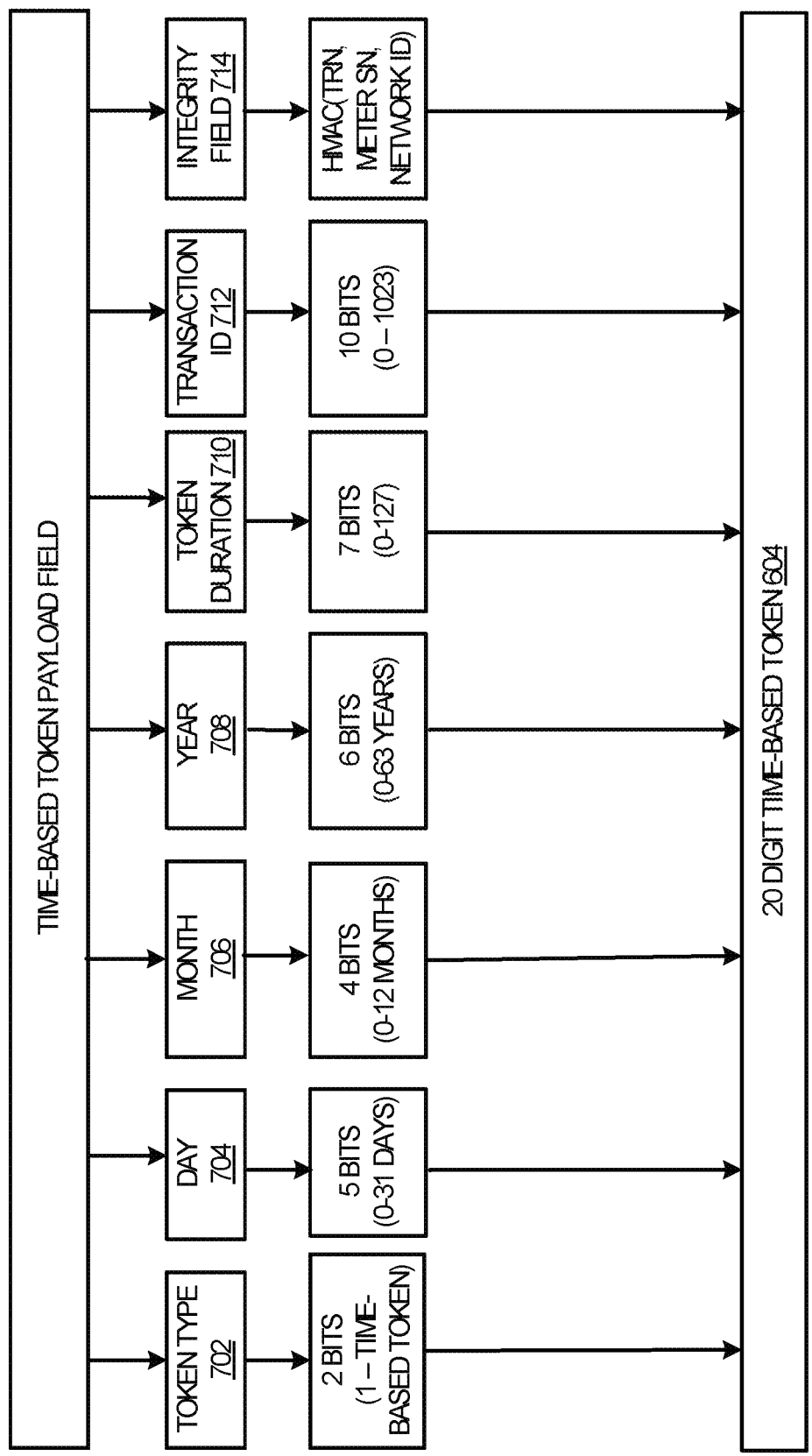
FIG. 7 shows an example of a payment-based token generated by a headend system and to be applied at a meter in a resource distribution network, according to certain examples of the disclosure.

Based on the request for time-based token 616, the headend system 104 generates a time-based token 604. The time-based token 604 is generated based on information such as the type of the token, the time duration associated with the token, the date on which the time duration starts, the serial number of the device, the meter for which the token is generated, and so on. These types of information may be explicitly included in one or more fields of the time-based token 604 or may be transformed before being included in the time-based token 604. FIG. 7 shows an example of a time-based token 604 generated by the headend system 104 according to certain examples of the disclosure.

In the example shown in FIG. 7, a time-based token 604 contains 66 bits which is equivalent to 20 decimal digits. As such the size of the time-based token 604 is the same as the size of the payment-based token 204 shown in FIG. 3. Similar to the payment-based token 204, the first two bits of the time-based token 604 is also used to represent the token type 702. In some examples, if the value of the token type 702 is 1, then the token is a time-based token. Other values of the token type 702 can be used to indicate other types of secure tokens. The next 15 bits of the time-based token 604 shown in FIG. 7 indicate the starting date of the time duration associated with the time-based token 604. For example, 5 and 4 bits of the 15 bits can be used to represent the day 704 and month 706 of the starting date, respectively. Six bits of the 15 bits can be used to represent the lower two digits of the year 708 of the starting date.

The time-based token 604 shown in FIG. 7 further includes a token duration 710 which is represented by 7 bits to define the time duration associated with the token 604 which can be any value between 1 and 127 days. The time duration associated with the time-based token 604 may be specified in the request for time-based token 616. In other examples, the time duration might be determined or adjusted by the headend system based on certain rules. For instance, the rule might specify that the time duration cannot be more than 7 days for a user who first requests the time-based token 604, and can be no more than 5 days for a user who requests the time-based token 604 for the second time. The maximum time duration that a user can request for the time-based token 604 decreases as the number of times the user requests for the time-based token 604 increases. Other types of rules might also be utilized.

Similar to the payment-based token 204, the time-based token 604 shown in FIG. 7 further includes a 10-bit field of transaction ID 712. In some examples, the transaction ID 712 represents the least significant 10 bits of the full TRN which is a binary number uniquely representing the sequential token number for the meter 112. After an initial starting value, each token generated for the meter 112, whether it is a payment-based token or a time-based token, will have a monotonically increasing sequential TRN. In some examples, the TRN is a 32-bit number between 0 and 4294967295 and the transaction ID 712 represents the least significant 10 bits of this 32-bit number.

The time-based token 604 shown in FIG. 7 also includes an integrity field 714 which is uniquely calculated using a cryptography tool, such as the hash-based message authentication code (HMAC). The integrity field 714 of the time-based token 604 can be generated by applying the cryptography tool to encrypt data such as one or more of fields 702-710 of the time-based token 604, the serial number of the meter 112, the network ID of the meter 112, and information that is unique to the token within the resource distribution network, such as the TRN of the token. In some examples, the headend system 104 generates the HMAC using a hash function such as the secure hash algorithm SHA-256 based on the secret key that is included in the provisioning data 202. In this way, the meter 112 can, after receiving the time-based token 604, use the same secret key to generate the HMAC and compare the generated HMAC with that included in the integrity field 714 of the received time-based token 604 to validate the token. The validation includes, for example, determining the integrity and the authenticity of the payment-based token 204. It should be understood that cryptography tools other than HMAC or other than SHA-256 can also be used to generate the integrity field 714.

Returning to FIG. 6, after the headend system 104 generates the time-based token 604, the headend system 104 sends the time-based token 604 back to the system that requested for the time-based token 604, such as the service system 210. The user 120 can thus obtain a copy of the generated time-based token 604. By obtaining a copy of the time-based token 604, the user 120 can apply the time-based token 604 at the meter 112 using the handheld device 106 without relying on the headend system 104. As discussed above with regard to FIG. 2, the handheld device 106 can be configured to present a user interface that allows the user 120 to enter the time-based token 604 and to transmit the time-based token 604 to the meter 112

Alternatively, the user 120 can request to have the time-based token 604 to be applied automatically by the headend system 104 to the meter 112. Such a request can be included in the request for time-based token 616 so that the headend system 104 can act accordingly. If the user 120 requests the automatic application of the time-based token 604, the headend system 104 sends the time-based token 604 to the meter 112 via the mesh network 140. If the user 120 does not request the automatic application of the time-based token 604, the headend system 104 will not send the time-based token 604 to the meter 112. In some examples, the user 120 may choose to allow the headend system 104 to automatically apply the time-based token 604 to the meter 112 with a certain amount of delay. In those examples, the headend system 104 waits for the specified amount of delay duration, and then sends the time-based token 604 to the meter 112 over the mesh network 140.

After receiving the time-based token 604, either from the handheld device 106 or from the headend system 104, the meter 112 can validate the time-based token 604. The meter 112 can parse the time-based token 604 to determine each field contained in the time-based token 604. The meter 112 further uses the secret key contained in the provisioning data 202 to generate an authentication code, such as the HMAC, based on the same information that is used by the headend system 104 to generate the integrity field 714. The information can include, for example, the serial number of the meter, the network ID of the meter, the TRN and the other fields of the time-based token 604, such as the token type 702, the starting date (fields 704-708), the token duration 710, and the transaction ID 712. If the generated authentication code matches the integrity field 714 of the time-based token 604, the meter 112 can determine that the time-based token 604 is generated by the headend system 104 and the content of the time-based token 604 has not been altered.

Similar to the payment-based token 204, including the identifier of the meter 112, such as the serial number and the network ID of the meter 112, in the generation of the integrity field 714 for time-based token 604, the time-based token 604 is made specific to the intended meter 112. A meter can determine whether a received time-based token 604 is a proper token by determining whether the calculated authentication code matches the integrity field 714 or not, and only apply the time-based token 604 that is intended for it. In some examples, validating the received time-based token 604 also includes determining whether the time-based token 604 is within an acceptable window and whether it is a duplicate token that has been received and processed before. Further details of determining the acceptable window and determining whether the time-based token 604 is within the acceptable window are provided below with regard to FIG. 9.

If the meter 112 determines that the received time-based token 604 is not a valid token, the meter 112 rejects or denies the time-based token 604. Otherwise, the meter 112 connects the premises 132 at the geographical location of the meter 112 to the resource supply 130 starting from the start date and for the time duration specified in the time-based token 604. After the specified time duration has passed, the meter 112 remain connected or disconnect the resource supply 130 based on the balance associated with the meter 112. In other words, if the balance is negative or below a threshold balance value, the meter 112 disconnects the premises 132 from the resource supply 130; otherwise, the meter 112 continues to connect the premises 132 with the resource supply 130.

Similar to the payment-based token 204, the meter 112 will generate and transmit a token application response 218 or an event message 222 to the headend system 104 depending on where the meter 112 received the time-based token 604. If the time-based token 604 is received from the headend system 104, the meter 112 generates a token application response 218 to report the status of the time-based token 604 received at the meter 112. In some implementations, the token application response 218 includes the status of the time-based token 604, such as "token has been applied successfully at the meter," "token is rejected because it is outside the acceptable window," "token is rejected because it is a duplicate," "token is rejected because it failed integrity check," and so on.

The token application response 218 can further include other information, such as the time duration applied at the meter 112, or the status of the meter switch 134 (e.g. open/disconnected or closed/connected). The token application response 218 may also include the time-based token 604 or the serial number of the time-based token 604, such as the TRN or the transaction ID. The token application response 218 may be sent along with other data sent from the meter 112 to the headend system 104, such as the collected meter data, or sent separately.

If the time-based token 604 is received through the handheld device 106, the meter 112 generates and transmits an event message 222 containing the time-based token 604 to the headend system 104 to report the time-based token 604. The event message 222 may also include other data, such as the status of the time-based token 604, the status of the meter switch 134 or any other data that is included in the token application response 218. The event message 222 can also be sent to the headend system 104 along with other data, such as the collected meter data, or sent separately.

Upon receiving the event message 222, the headend system 104 analyzes the time-based token 604 to determine whether the time-based token 604 included in the event message 222 was generated by the headend system 104, such as by searching in the past tokens generated by the headend system 104. The headend system 104 is then configured to send the analysis results to the meter 112. If the analysis results show that the time-based token 604 was not generated by the headend system 104, the meter 112 can disconnect the resource supply 130 and update the balance associated with the meter to reflect the resource consumption that occurred during the connection. The meter 112 may also cause the handheld device 106 to display a warning message to indicate the analysis results and the actions carried out by the meter 112 based on the analysis results.

Figure 8:
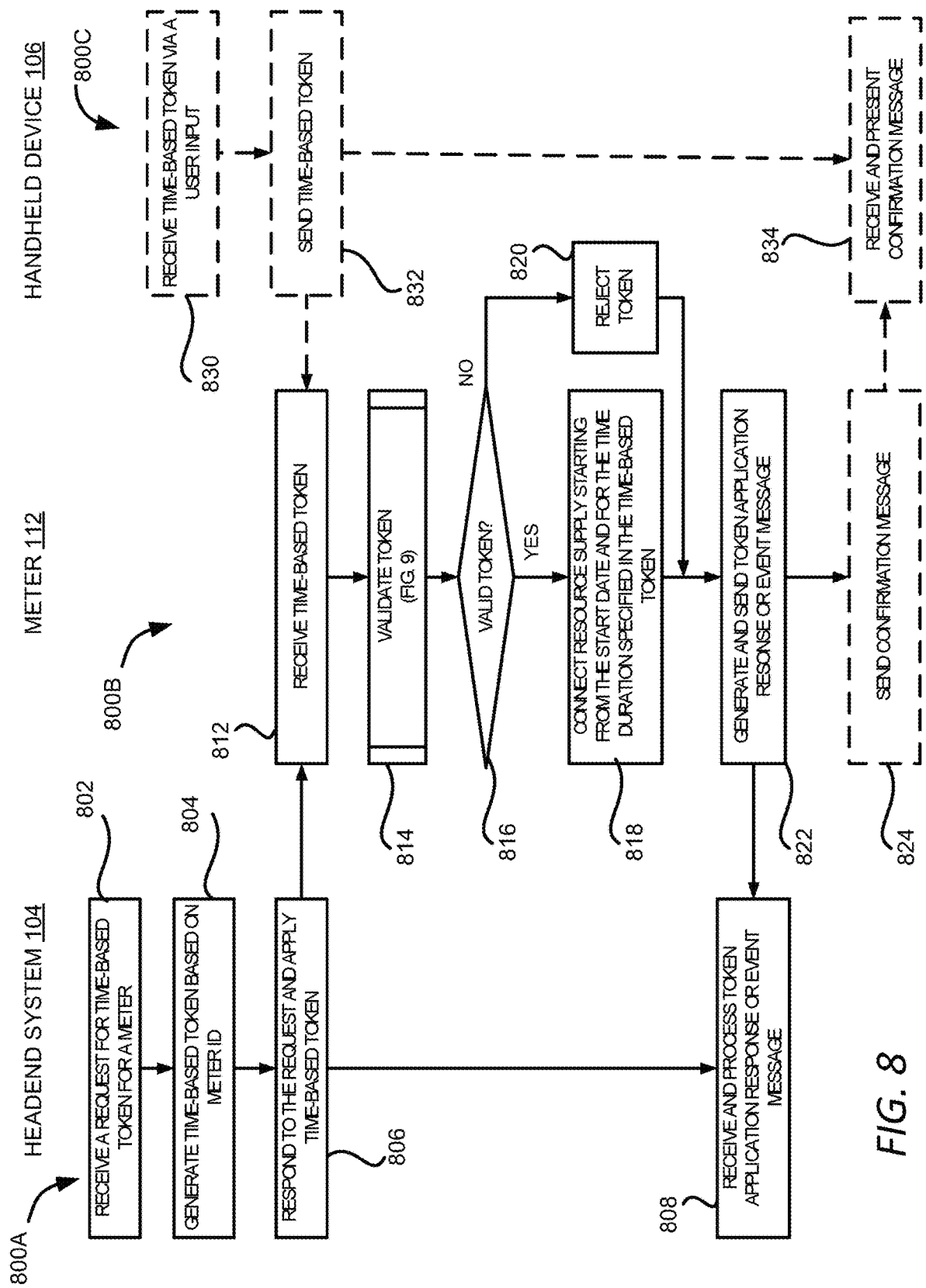
FIG. 8 shows an example of processes for generating and applying a payment-based token at a meter in a resource distribution network, according to certain examples of the disclosure.

FIG. 8 shows an example of processes for generating and applying a time-based token 604 at a meter 112 in a resource distribution network, according to certain examples of the disclosure. In particular, FIG. 8 includes processes 800A, 800B, and 800C. The process 800A illustrates aspects of the headend system 104. The process 800B illustrates aspects of the meter 112. The process 800C illustrates the aspects of the handheld device 106. The processes 800A, 800B, and 800C will be described together below.

The process 800A begins at block 802 where the headend system 104 receives a request for time-based token 616 for a meter 112. As discussed above with regard to FIG. 6, the request for time-based token 616 might be generated by the service system 210 in response to a request by a user 120. At block 804, the process 800A involves generating a time-based token 604 for the meter 112. To make the time-based token 604 specific to the meter 112, the headend system 104 generates the time-based token 604 based on an identifier of the meter 112, such as the serial number of the meter 112, the network ID of the meter 112, or a combination thereof. In addition, the generated time-based token 604 also includes or is based on a serial number unique to the time-based token 604 in the mesh network 140, such as the TRN. The time-based token 604 also indicates the time duration for the meter 112 to connect the resource supply 130 to the premises 132 as well as the starting date of the time duration.

In one example, the time-based token 604 is generated according to the format shown in FIG. 7, which includes a token type 702, a start date 704-708, a token duration 710, a transaction ID 712 and an integrity field 714. In some implementations, the integrity field 714 is generated by using a secret key to generate an HMAC based on one or more of the fields 702-712 of the time-based token 604, the identifier of the meter 112, such as the serial number and the network ID, and the TRN of the payment-based token 204.

At block 806, the process 800A involves responding to the request for time-based token 616 with the generated time-based token 604. For example, the headend system 104 sends the time-based token 604 to the entity that requested the time-based token 604, such as the service system 210. If the user 120 authorizes the headend system 104 to automatically apply the generated time-based token 604 to the meter 112, block 806 further involves applying the time-based token 604 to the meter 112 by sending the time-based token 604 to the meter 112. The application of the payment-based token 204 to the meter 112 may be performed immediately or with a certain delay, depending on the selection made by the user 120 when providing the authorization to the headend system 104 to apply time-based token 604.

If the user 120 does not authorize the headend system 104 to apply the time-based token 604 to the meter 112, the user 120 can manually input the time-based token 604 at the handheld device 106. At block 830, the process 800C involves receiving the time-based token 604 at the handheld device 106 through user input. At block 832, the process 800C involves sending the received time-based token 604 to the meter 112 through, for example, a HAN.

At block 812, the process 800B involves the meter 112 receiving the time-based token 604, either from the headend system 104 or from the handheld device 106. At block 814, the process 800B involves validating the time-based token 604 to determine if the received time-based token 604 is a valid token. The validation process might include for example, determining the integrity of the time-based token 604, determining that the time-based token 604 is generated for the meter 112, determining that the token is within the acceptable window, determining the token is not a duplicate token, and so on. Additional details regarding validating the time-based token 604 are provided below with regard to FIG. 9.

At block 816, the process 800B involves determining whether the time-based token 604 is a valid token based on the validation result obtained in block 814. If not, the process 800B involves rejecting the time-based token 604 at block 820. If the time-based token 604 is a valid token, the process 800B involves, at block 818, connecting the resource supply 130 starting from the start date specified in the time-based token 604 and for the time duration indicated in the token duration field 710.

At block 822, the process 800B involves sending a token application response 218 as discussed above with regard to FIG. 6, if the time-based token 604 is received from the headend system 104. In some implementations, the token application response 218 includes information such as the status of the time-based token 604 (such as accepted or rejected), the time duration specified in the time-based token 604, the status of the meter switch 134 (e.g. open/disconnected or closed/connected), or other information. The token application response 218 may also include the time-based token 604 or the serial number of the time-based token 604, such as the TRN or the transaction ID.

If the time-based token 604 is received from the handheld device 106, the meter 112 generates and sends an event message 222 to the headend system 104 to inform the headend system 104 about the received time-based token 604 and requests the headend system 104 verify the time-based token 604. The event message 222 may contain similar content as the token application response 218, such as the status of the payment-based token 204, the time duration specified in the time-based token 604, the status of the meter switch 134 (e.g. open/disconnected or closed/connected) and so on. The event message 222 also includes the entire time-based token 604 and a request for the headend system 104 to verify the authenticity of the time-based token 604. As discussed above with regard to FIG. 6, the token application response 218 or the event message 222 may be sent along with the meter data collected at the meter 112 or sent separately to the headend system 104.

The headend system 104 receives the token application response 218 or the event message 222 at block 808 and processes the received message accordingly. For example, if the headend system 104 receives an event message 222, the headend system 104 verifies the payment-based token 204 contained in the event message 222 to determine if the time-based token 604 was indeed generated by the headend system 104. The headend system 104 notifies the meter 112 about the verification results, for example, by sending a notification to the meter 112. The meter 112 can take actions according to the verification results, such as disconnecting the resource supply 130 from the premises 132 if the time-based token 604 is not generated by the headend system 104.

If the time-based token 604 is received from the handheld device 106, the process 800B further involves the meter 112 sending a confirmation message to the handheld device 106 at block 824. The confirmation message can include, for example, the status of the time-based token 604 (e.g. accepted or rejected), the time duration and the start date specified in the time-based token 604, the status of the meter switch 134 (e.g. open/disconnected or closed/connected) and the like. The handheld device 106 receives the confirmation message at block 834 and presents it to the user 120 in a user interface.

Figure 9:
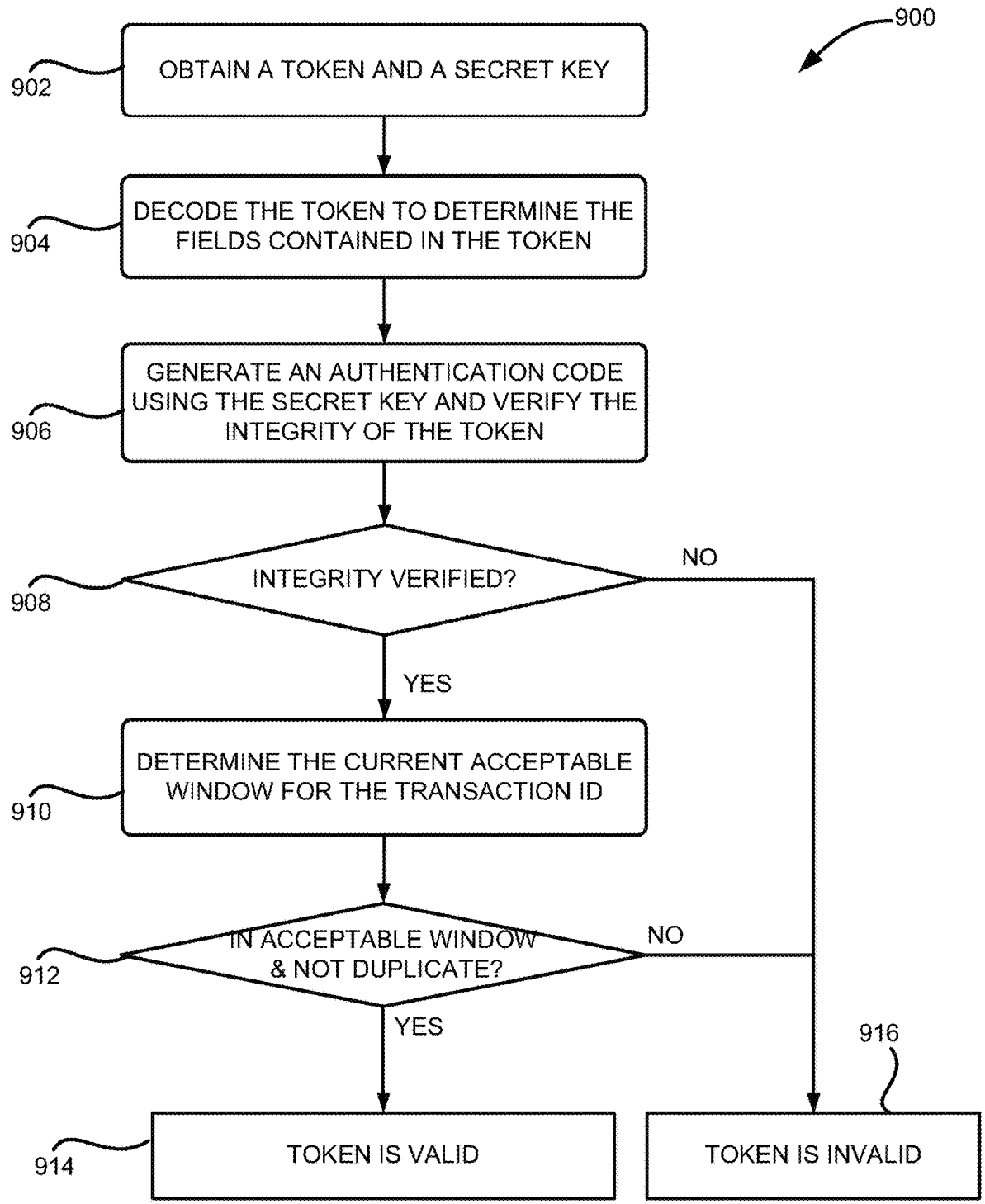
FIG. 9 shows an example of a process for validating a secure token at a meter, according to certain examples of the disclosure.

FIG. 9 shows an example of a process 900 for validating a secure token at a meter 112, according to certain examples of the disclosure. The secure token can be a payment-based token 204 or a time-based token 604. The process 900 can be used to implement block 514 of the process 500B or block 814 of the process 800B. The meter 112 (e.g., the meter in the environment 100, 200 or 600) implements operations depicted in FIG. 9 by executing suitable program code. For illustrative purposes, the process 900 is described with reference to certain examples depicted in the figures. Other implementations, however, are possible.

At block 902, the process 900 involves obtaining a secure token, such as the payment-based token 204 described above with regard to FIGS. 2-5 or the time-based token 604 described above with regard to FIGS. 6-8. The process 900 further involves obtaining a secret key from the provisioning data 202. As discussed above with regard to FIGS. 2 and 4, the headend system 104 includes a secret key in the provisioning data 202 sent to the meter 112 during the provisioning process. The secret key is used by the headend system 104 to generate the integrity field of the secure token.

At block 904, the process 900 involves decoding the secure token to determine the individual fields contained in the secure token. For example, if the secure token is formatted as shown in FIG. 3 or 7, the meter 112 may determine the type of the secure code by examining the first two bits of the secure token, which shows the token type. If the token type is 0, then the meter 112 can determine that the secure token is a payment-based token 204; if the token type is 1, then the meter 112 can determine that the secure token is a time-based token 604. Based on the type of the secure token, the meter 112 can decode the rest of the fields of the token, such as the sub-type 304, the credit value 306, the transaction ID 308 of the payment-based token 204, the integrity field 310, or the starting date 704-708, the token duration 710, transaction ID 712 and the integrity field 714 of the time-based token 604.

At block 906, the process 900 involves generating an authentication code for the secure token using the secret key and verifying the integrity of the token based on the authentication code. In some implementations, the meter 112 can generate the authentication code in the same way as the headend system 104 generates the integrity field 310 or 714 and using the same secret key. For example, the headend system 104 generates the integrity field of the secure token by generating an HMAC based on the other fields of the secure token, the serial number of the meter 112, the network ID of the meter 112, and the TRN of the secure token and using SHA-256 algorithm. In such an example, the meter 112 can apply the same cryptograph algorithm using the same secret key on the decoded version of the same fields, and other corresponding information available at the meter 112, such as the serial number of the meter 112, the network ID of the meter 112. If the generated authentication code matches the data contained in the integrity field of the received secure token, the meter 112 can determine that the secure token is intended for the meter 112 and has not been altered. Otherwise, the integrity verification of the secure token has failed.

At block 908, the process 900 involves determining whether the integrity of the secure token has been verified based on the comparison results obtained at block 906. If not, the meter 112 can determine that the secure token is invalid. If the meter 112 has successfully verified the integrity of the secure token, the meter 112 can continue to examine other aspects of the secure token to determine its validity.

At block 910, the process 900 involves determining the current acceptable window for the TRN or transaction ID (TID) of the secure token. If the TRN or the transaction ID of the secure token falls within the acceptable window, then the meter 112 can accept the secure token; otherwise, the meter 112 will reject the secure token. The meter 112 can determine the acceptable window based on the token acceptance parameters in the provisioning data 202. In some examples, the token acceptance parameters include a $TID_F$, a $TID_{POS}$ and a $TID_{NEG}$. Here, the $TID_F$ represents a floor value of acceptable TIDs. In other words, the lowest TID that is acceptable at the meter 112 is $TID_F$. $TID_{POS}$ represents the largest positive offset of an acceptable TID compared to a current acceptable TID, $TID_{current}$. $TID_{NEG}$ represents the largest negative offset of an acceptable TID compared to the $TID_{current}$. In other words, the $TID_{POS}$ and $TID_{NEG}$ define an acceptable window for the TID of a received secure token, i.e. $[TID_{current}+TID_{NEG}, TID_{current}+TID_{POS}]$. Here, the $TID_{current}-TID_{NEG}$ defines the lower boundary of the acceptable window and $TID_{current}+TID_{POS}$ defines the upper boundary of the acceptable window. However, note that because an acceptable TID cannot be lower than the $TID_F$, the acceptable window can be reformulated as:

$$[\max(TID_F, TID_{current}-TID_{NEG}), TID_{current}+TID_{POS}].$$

The current acceptable TID, $TID_{current}$, is updated by the meter 112 based on the received secure tokens. In one example, the $TID_{current}$ is set to be the highest TID of the secure tokens that have been previously received at the meter 112, including both the payment-based token 204 and the time-based token 604. If the currently received secure token has a TID falling inside this acceptable window, the meter 112 can determine that the secure token is acceptable; otherwise, the secure token is unacceptable.

For example, if $TID_{current}$ is 10, $TID_{POS}$ is 5, $TID_{NEG}$ is 3 and $TID_F$ is 4, the acceptable window becomes [7, 15]. Any secure token with a TID lower than 7 or higher than 15 is not acceptable at the meter 112 at this moment. This mechanism prevents the order of the secure tokens being applied from deviating too significantly from the order of the TRNs generated for the secure tokens. In the above example, the acceptable window of [7, 15] ensures that the TID of an acceptable secure token is close to 10, a TID that has been accepted at the meter 112.

Note that in this example, the TID is used to determine the acceptable window for the secure token, and the TID is a truncated version of the full TRN of the secure token, such as the 10 least significant bits of the TRN. As the current received TID exceeds its maximum number, e.g. 1023, the TID will return to 0 and start increasing one by one. The meter 112 can be configured to recognize this scenario, and adjust the acceptable window accordingly. For example, the meter 112 might determine the lower boundary of the acceptable window to be 1021 and the upper boundary of the acceptable window to be 3. In this example, any token with a TID falling within [1021, 1022, 1023, 0, 1, 2, 3] is acceptable.

At block 912, the process 900 involves determining whether the TID of the received secure token falls within the acceptable window. The meter 112 further determines whether the secure token is a duplicate token that has been received and applied before. The meter 112 can access the past token IDs 220 stored at the meter 112 to detect duplication. If the meter 112 determines that the TID of the secure token is outside the acceptable window or that the secure token has been applied before, the meter 112 determines, at block 916, that the secure token is invalid. Otherwise, the meter 112 determines, at block 914, that the secure token is a valid token.

In normal situations, the headend system 104 is available for the generation of the payment-based tokens or time-based tokens, communicating with the meters 112 to apply secure tokens at the meters 112, etc. In other situations, however, the mesh network 140 might become unavailable or unstable and the headend system 104 might become unavailable, such as in an extreme weather condition or natural disaster. In these situations, it would be impossible for users 120 to make payment to request payment-based tokens or to request time-based tokens. In order for users to be able to continue to use the resource in these extreme situations, the headend system 104 is further configured to issue global tokens.

As briefly discussed above, a global token is a type of secure token that is not specific to any meter 112. In other words, the same global token can be applied at multiple meters 112 in the mesh network 140. Each global token has a time duration associated therewith instructing the meter 112 to keep the resource supply 130 connected for that time duration. By using global tokens, users 120 can have access to resource supply even if the headend system 104 becomes unavailable to generate tokens based on user requests.

Figure 10:
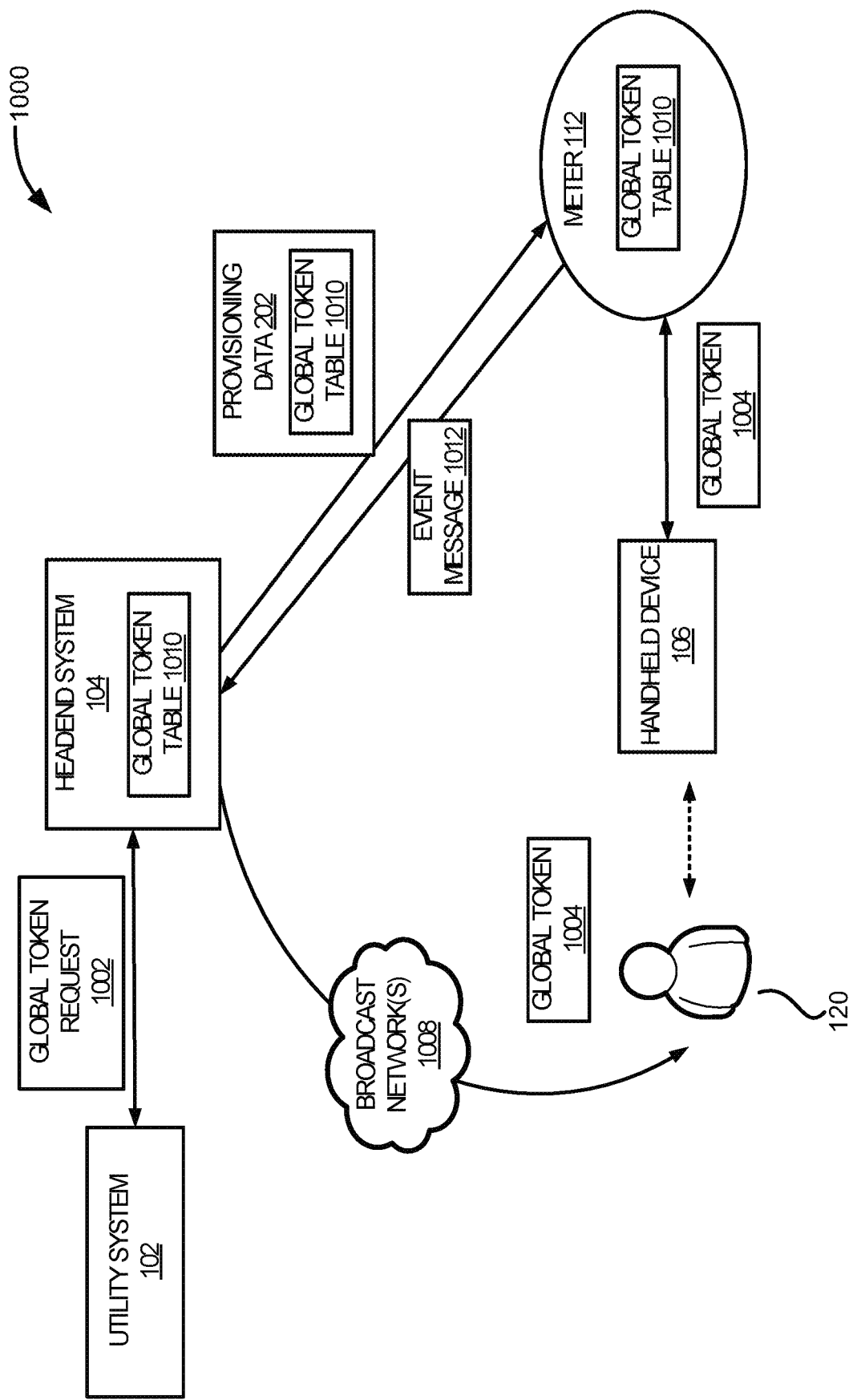
FIG. 10 is a diagram showing an illustrative operating environment for generating and applying global tokens at meters in a resource distribution network, according to certain examples of the disclosure.

FIG. 10 shows an illustrative operating environment 1000 for generating and applying global tokens at meters 112 in a resource distribution network, according to certain examples of the disclosure. The environment 1000 includes the utility system 102, the headend system 104, and the meters 112 and their associated handheld devices 106 as discussed above with regard with FIGS. 1-9. FIG. 10 shows one of the meters 112 in the resource distribution network.

In some examples, the utility company might determine that a special situation has arisen, such as the weather forecast shows an extreme weather condition is coming, and the headend system 104 might become unavailable for a period of time. The utility company can decide to issue a global token to the meters 112 in the network by sending a global token request 1002 to the headend system 104 through the utility system 102. The global token request 1002 can specify the time duration associated with the global token.

Upon receiving the global token request 1002, the headend system 104 can generate or otherwise obtain a global token 1004 that is associated with the specified time duration. In some implementations, the headend system 104 generates the global token 1004 in response to the global token request 1002. In other implementations, the global token 1004 is obtained from a global token table 1010 stored at a location that is accessed by the headend system 104. In one example, the global token table 1010 includes a list of global tokens that are acceptable by the meters 112. Each of the global tokens in the global token table 1010 is mapped to a time duration. As such, the headend system 104 can retrieve the corresponding global token 1004 based on the time duration specified in the global token request 1002.

Figure 11:
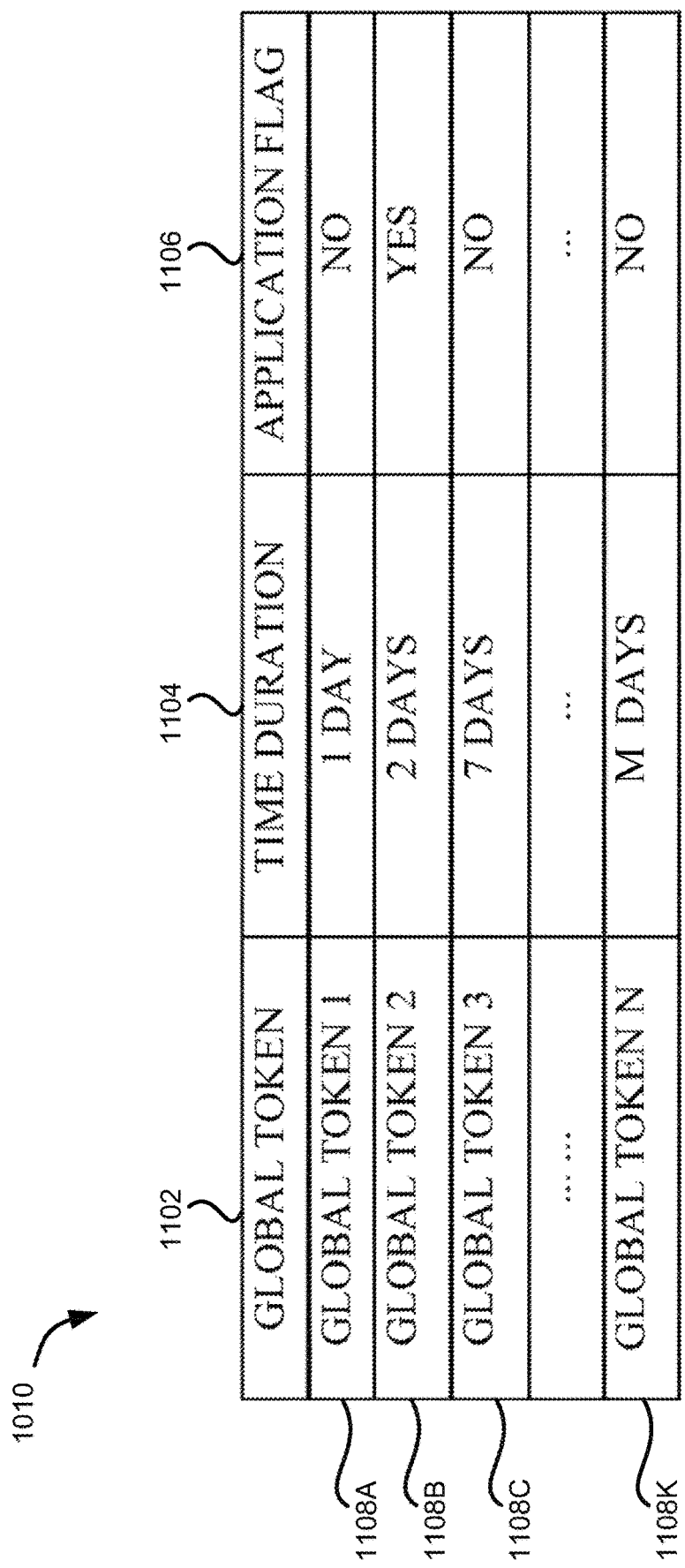
FIG. 11 shows an example of a global token table, according to certain examples of the disclosure.

FIG. 11 shows an example of the global token table 1010, according to certain examples of the disclosure. In this example, the global token table 1010 includes a list of global tokens 1108A-1108K. For each global token in this list, there is a time duration 1104 associated therewith. For example, global token 1 in the example shown in FIG. 11 has a time duration of 1 day; global token 2 has a time duration of 2 days; and the global token N has a time duration of M number of days. Here, M can be any positive integer, such as 127.

In the example shown in FIG. 11, the global token table 1010 also have an application flag 1106 for each global token in the table to indicate whether the corresponding global token has been applied or used or not. For example, if global token 2 has been used last time when there was a hurricane in the area, the application flag for global token 2 can be set to YES indicating that this global token has been used. As such, each time when the headend system 104 issues a global token, the headend system 104 will select a global token from the global token table 1010 that corresponds to the requested time duration and that has not been used before. One benefit of only allowing a global token to be used once is to prevent fraud and misuse of the token. For example, if a global token is allowed to be used repeatedly, then a user who was authorized, but is no longer authorized to access the resource supply could use a past global token to get the resource while the headend is available at the special situation. Using the global token once can prevent this kind of issues.

It should be understood that the example of the global token table 1010 shown in FIG. 11 is for illustration purpose only and should not be construed as limiting. The global token table 1010 may be constructed in any other formats. For example, the global token table 1010 may include only the global token and the corresponding time duration without the application flag. In such a scenario, whether a global token has been used or not may be indicated using other mechanisms.

Figure 12:
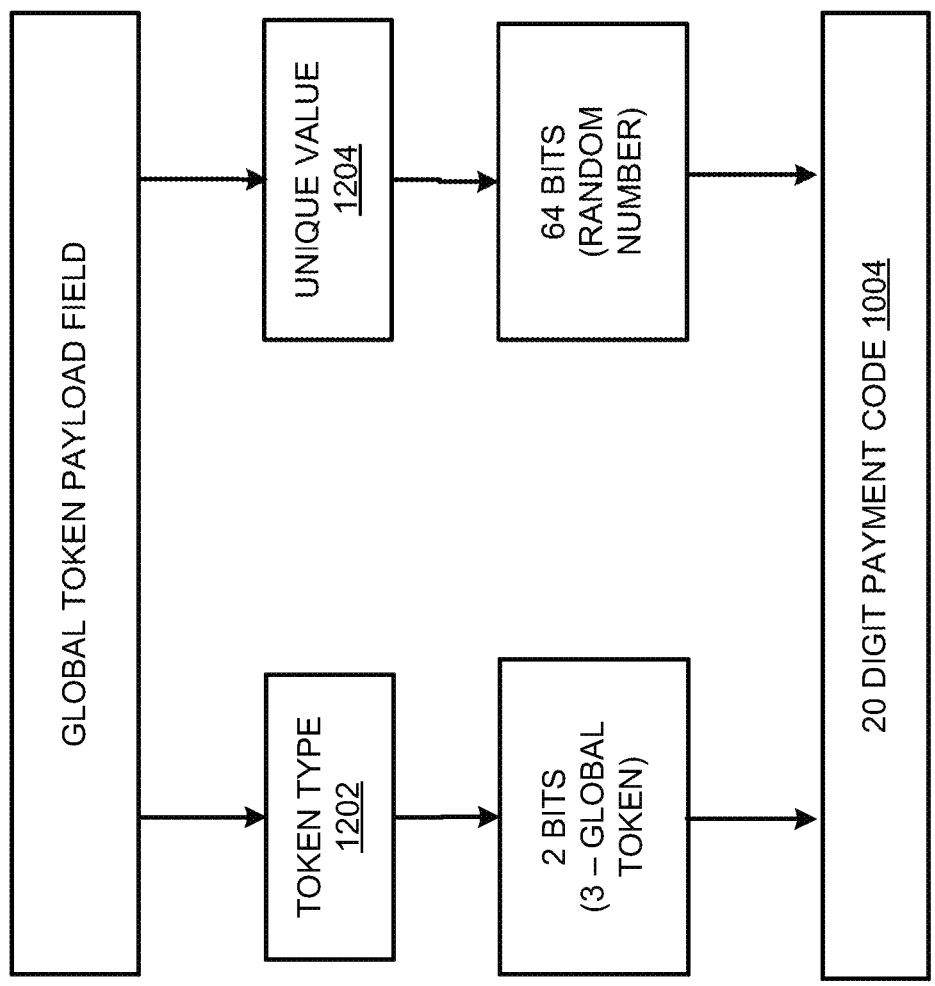
FIG. 12 shows an example of a global token that can be applied at a meter in a resource distribution network, according to certain examples of the disclosure.

FIG. 12 shows an example of a global token 1004 that can be applied at a meter 112 in a resource distribution network, according to certain examples of the disclosure. In this example, a global token 1004 contains 66 bits which is equivalent to 20 decimal digits. The size of the global token 1004 is the same as the size of the time-based token 604 shown in FIG. 7 and is the same as the size of the payment-based token 204 shown in FIG. 3. Similar to the payment-based token 204 and the time-based token 604, the first two bits of the global token 1004 is used to represent the token type 1202. In some examples, if the value of the token type 1202 is 3, then the token is a global token. Other values of the token type can be used to indicate other types of secure tokens. The next 64 bits of the global token 1004 shown in FIG. 12 contains a random number that uniquely identifies the global token 1004.

Returning to FIG. 10, in some examples, the global token table 1010 is generated at the headend system 104 by generating the global tokens 1004 and their corresponding time durations. In other examples, the global token table 1010 is generated by the utility system 102 or another system associated with the utility company and transmitted to the headend system 104. In either case, the headend system 104 also transmits the global token table 1010 to the meters 112 via the mesh network 140. In some implementations, the global token table 1010 can be transmitted to each meter 112 in the corresponding provisioning data 202 transmitted to the meter 112. In other implementations, the global token table 1010 is transmitted to the meter 112 separately from the provisioning data 202.

Based on the global token table 1010, the headend system 104 can retrieve a global token 1004 as specified in the global token request 1002. The headend system 104 further causes the global token 1004 to be broadcast through a broadcast network 1008. The broadcast network 1008 is different from the mesh network 140 because the mesh network 140 might have already become unavailable or unstable. The broadcast network 1008 may be a radio network, a TV network, an Internet, a cellular network, or any other type of networks that can be utilized to broadcast the global token 1004 so that users 120 can be notified about the global token 1004.

After obtaining the global token 1004 through the broadcast network 1008, the user 120 can input the global token 1004 to the meter 112, such as through the handheld device 106. The meter 112 verifies the received global token 1004 by determining if the received global token 1004 is included in the global token table 1010 and has not been used before. If so, the meter 112 can determine that the global token 1004 is a valid token. Otherwise, the global token 1004 is an invalid token and is rejected by the meter 112.

In some examples, the meter 112 determines that a global token has been used before by checking the application flag 1106 associated with the global token 1004 in the global token table 1010. If the application flag 1106 indicates that the global token 1004 has not been used before, the meter 112 applies the global token 1004 at the meter 112 by connecting the resource supply 130 for the time duration associated with the global token 1004. The meter 112 also updates the application flag 1106 for the global token 1004 in the global token table 1010 to indicate that this global token 1004 has now been used.

After the special situation is over and the mesh network 140 and the headend system 104 have recovered, the meter 112 can transmit an event message 1012 to the headend system 104 to report the global token 1004 processed by the meter 112. The event message 1012 might include the global token 1004 received by the meter 112 and other data, such as the status of the global token 1004 (applied or rejected), the time duration specified in the global token 1004, the time when the global token 1004 was applied, the status of the meter switch 134 and so on. The event message 1012 can be sent separately to the headend system 104 or along with other data sent from the meter 112, such as the meter data collected by the meter 112.

After receiving the event message 1012, the headend system 104 analyzes the global token 1004 included in the event message 1012 to determine whether the global token 1004 was generated or issued by the headend system 104, such as by searching the global token table 1010. The headend system 104 is then configured to send the analysis results to the meter 112. If the analysis results show that the global token 1004 was not properly issued by the headend system 104, the meter 112 can disconnect the resource supply 130 and update the balance associated with the meter 112 to reflect the resource consumption that occurred during the time duration when the connection was established. The meter 112 may also cause the handheld device 106 to display a warning message to indicate the analysis results and the actions carried out by the meter 112 based on the analysis results.

As mentioned above, in some examples, each global token 1004 is allowed to be used once. As such, after a global token 1004 is issued, the headend system 104 will label such a global token 1004 as having been used and thus will not use it again. After all or a portion of the global tokens in the current global token table 1010 have been used, the headend system 104 or the utility system 102 or another system associated with the utility company can generate a new global token table 1010 containing a different set of global tokens. In further examples, a global token table 1010 is configured to be acceptable for a given period of time and the global tokens contained in the global token table 1010 may only be used during that period of time. As such, a new global token table 1010 can also be generated for another period of time if the current period of time has expired.

The headend system 104 stores the new global token table 1010 and also transmits the new global token table 1010 to the meters 112 in the mesh network 140 to replace the existing global token table 1010. Thereafter, the next global token 1004 will be selected from the new global token table 1010 based on the time duration specified in the global token request 1002.

Figure 13:
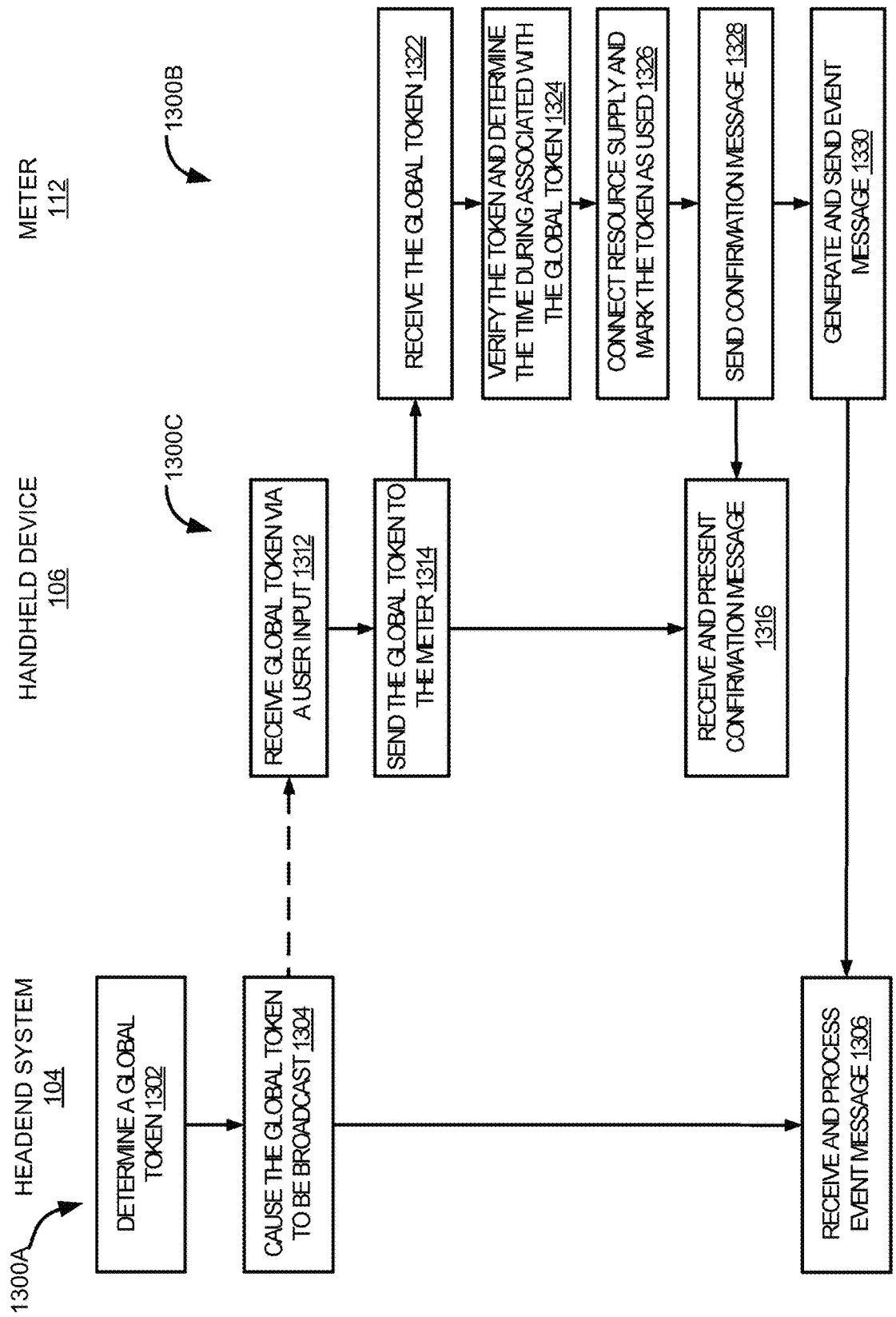
FIG. 13 shows an example of processes for generating and applying a global token at a meter, according to certain examples of the disclosure.

FIG. 13 shows an example of processes for issuing and applying a global token at a meter, according to certain examples of the disclosure. The example shown in FIG. 13 assumes that the global token table 1010 has been generated and stored at the headend system 104 and has been transmitted to the meters 112 in the mesh network 140. In particular, FIG. 13 includes processes 1300A, 1300B and 1300C. The process 1300A illustrates aspects of the headend system 104. The process 1300B illustrates aspects of the meter 112. The process 1300C illustrates the aspects of the handheld device 106. The processes 1300A, 1300B, and 1300C will be described together below.

The process 1300A begins at block 1302 where the headend system 104 determines a global token 1004 based on a global token request 1002. In one example, the headend system 104 determines the global token 1004 by selecting a global token from the global token table 1010 that has a time duration as specified in the global token request 1002 and has not been used before. At block 1304, the process 1300A involves causing the global token 1004 to be broadcast through one or more broadcast networks 1008.

The process 1300C begins at block 1312, where the handheld device 106 receives the global token 1004 through user input using, e.g. a keyboard or an image scanning device. At block 1314, the process 1300C involves sending the global token 1004 to the meter 112.

The process 1300B begins at block 1322, where the meter 112 receives the global token 1004 from the handheld device 106. At block 1324, the process 1300B involves verifying the global token 1004 and further involves determining the time duration associated with the global token 1004. In some examples, the meter 112 verifies the global token 1004 by determining whether the global token 1004 is listed in the global token table 1010. The meter 112 further determines whether the global token 1004 has been used before, for example, by examining the application flag 1106 for the global token 1004 in the global token table 1010. If the meter 112 determines that the global token 1004 is listed in the global token table 1010 and has not been used before, the meter 112 determines that the global token 1004 is a valid token; otherwise, the meter 112 rejects the global token 1004 as an invalid token.

At block 1326, the process 1300B involves, after determining that the global token 1004 is a valid token, connecting the premises 132 to the resource supply 130 for the time duration associated with the global token 1004. The meter 112 further updates the application flag associated with the global token 1004 to indicates that the global token 1004 has been applied at the meter 112. At block 1328, the process 1300C involves sending a confirmation message to the handheld device 106 to indicate the status of the global token 1004, such as being applied or rejected. The handheld device 106 receives that confirmation message at block 1316 and presents it to the user 120 through a user interface.

At block 1330, the process 1300B involves generating and sending an event message 1012 to the headend system 104. This occurs after the mesh network 140 and the headend system 104 are recovered and become available. The event message 1012 can include the global token 1004 received by the meter 112, the status of the global token 1004 (applied or rejected), the time duration specified in the global token 1004, the time when the global token 1004 was applied, the status of the meter switch 134 and so on.

At block 1306, the headend system 104 receives the event message 1012 and processes the event message 1012 to determine if the global token 1004 contained in the message is indeed issued by the headend system 104. The headend system 104 may also determine if the global token 1004 was applied during the period of time when the global token table 1010 was acceptable. As described above in detail with regard to FIG. 10, additional actions will be taken at the meter 112 if the headend system 104 determines that the global token 1004 was not issued properly by the headend system 104.

Figure 14:
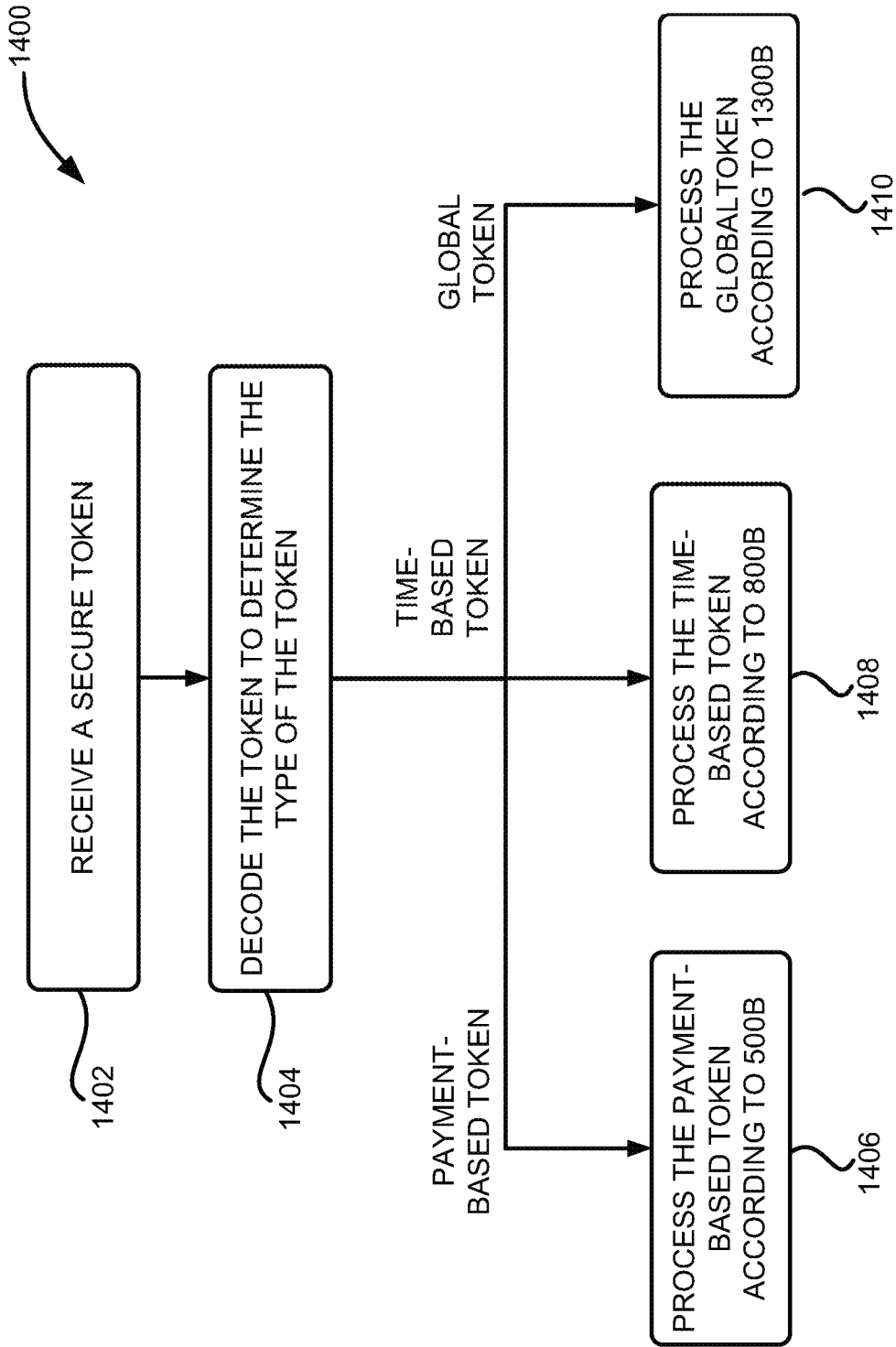
FIG. 14 shows an example of a process for receiving and processing a secure token at a meter, according to certain examples of the disclosure.

It should be understood that while the three types of secure tokens are discussed separately in the above description, they can co-exist in the system. In other words, the headend system 104 can be configured to generate or issue a payment-based token 204, a time-based token 604 or a global token 1004 depending on the received request. Each meter 112 in the mesh network 140 can also be configured to recognize and process these three types of secure tokens. FIG. 14 shows an example of a process 1400 for receiving and processing a secure token at a meter, according to certain examples of the disclosure. One or more nodes or meters of the mesh network 140 (e.g., the meter 112 or the root node 114) implement operations depicted in FIG. 14 by executing suitable program code. For illustrative purposes, the process 1400 is described with reference to certain examples depicted in the figures. Other implementations, however, are possible.

At block 1402, the process 1400 involves receiving a secure token. The secure token may be a payment-based token 204, a time-based token 604, or a global token 1004. The secure token may be received from the headend system 104 via the mesh network 140 or from the handheld device 106 via a HAN or other connections.

At block 1404, the process 1400 involves decoding the secure token to determine the type of the secure token. For example, if the token formats for the three types of secure tokens follow those shown in FIGS. 3, 7 and 12, the meter 112 can determine the type of the secure token by examining the first two bits of the received token. In the examples shown in FIGS. 3, 7 and 12, if the value of first two bits of the token is 0, then the token is a payment-based token 204; if the value is 1, then the token is a time-based token 604; and if the value is 3, then the token is a global token 1004.

Depending on the type of the secure token, the process 1400 involves different operations. If the secure token is a payment-based token 204, the process 1400 involves, at block 1406, processing the secure token according to process 500B discussed above with regard to FIG. 5. If the secure token is a time-based token 604, the process 1400 involves, at block 1408, processing the secure token according to process 800B discussed above with regard to FIG. 8. If the secure token is a global token 1004, the process 1400 involves, at block 1410, processing the secure token according to process 1300B discussed above with regard to FIG. 13.

It should be understood that although the present disclosure focuses on a resource distribution network configured for distributing resources to premises, such as water, gas, electricity, steam, the technologies presented herein can also be applied to other types of resources. For example, the technologies presented herein can be utilized to control the access to cellular resources. A user of cellular resource can either request a payment-based token by making a payment to his account or request a time-based token using a service system, such as a service system. These two types of tokens are generated to be specific to his cellphone, for example, by using the international mobile equipment identify (IMEI) number of the cellphone. In this way, the payment-based token or the time-based token can only be applied at the user's cellphone. Likewise, a global token might be generated and broadcast to users of the cellular resource in cases where the system responsible for generating the secure tokens becomes unavailable. In those cases, users can input the global token to their cellphones to continue using the cellular resource. Access to other resources, such as network resources, online computing resources, online storage resources, can also be controlled in a similar way.

Exemplary Meter

Figure 15:
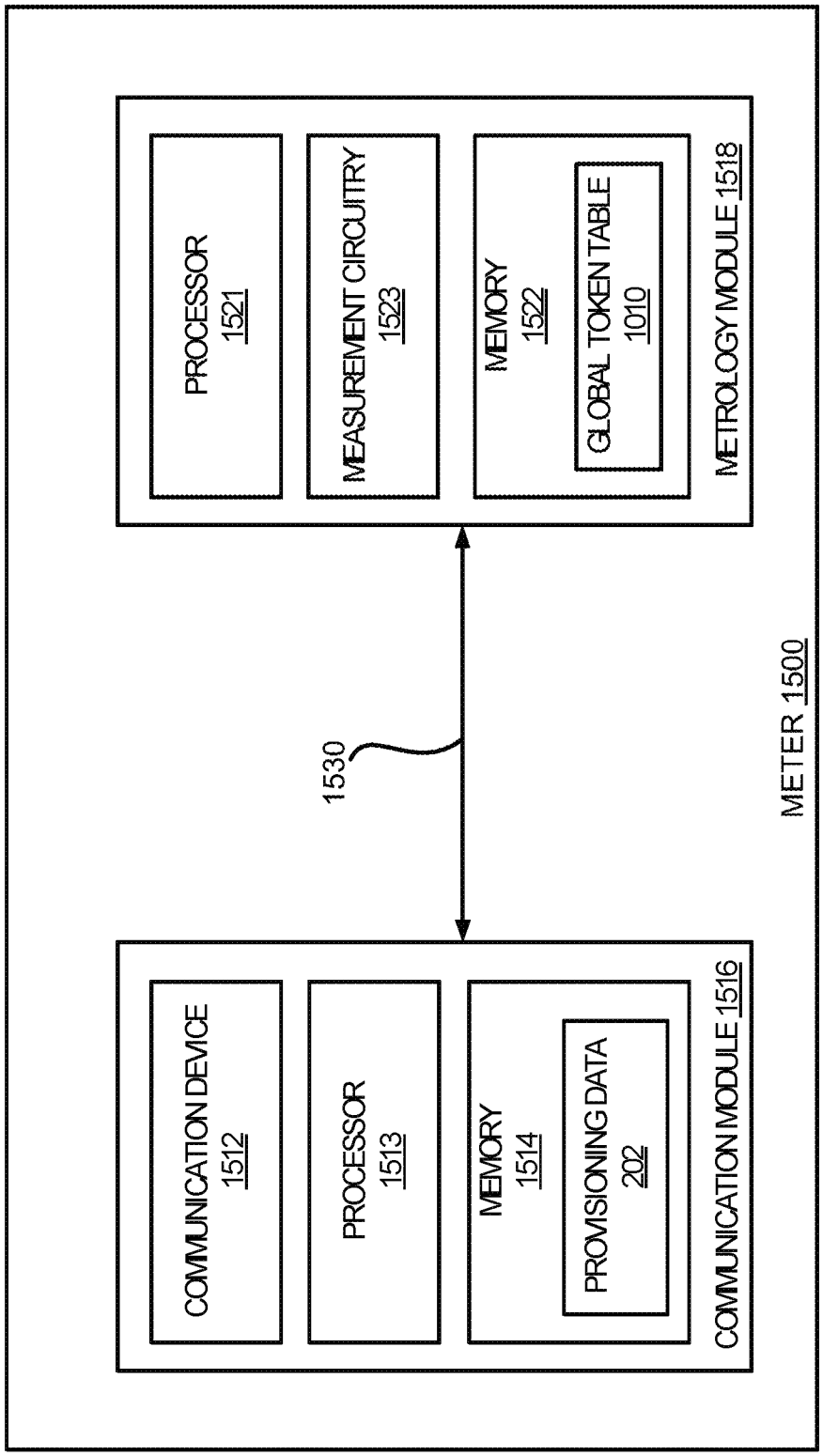
FIG. 15 is a block diagram depicting an example of a meter suitable for implementing aspects of the techniques and technologies presented herein.

FIG. 15 illustrates an exemplary meter 1500 that can be employed to implement the secure token processing mechanism described herein, such as a meter 112 or a root node 114. The meter 1500 includes a communication module 1516 and a metrology module 1518 connected through a local or serial connection 1530. These two modules may be housed in the same unit on separate boards hence the local connection 1530 may be an on-board socket. Alternatively, the modules may be housed separately and thus the local connection 1530 may be a communication cable, such as a USB cable, or another conductor. Since these two components may be physically separate, the communication module 1516 and the metrology module 1518 may be removed or replaced independently of each other.

The function of the communication module 1516 includes receiving and sending messages, including the secure tokens, through the mesh network 140. The function of the metrology module 1518 includes the functions necessary to manage the resource, in particular, to allow access to the resource and to measure the resource used. The communication module 1516 may include a communication device 1512 such as an antenna and a radio. Alternatively, the communication device 1512 may be any device that allows wireless or wired communication. The communication module 1516 may also include a processor 1513, and memory

1514. The communication device 1512 is used to receive and send messages through the network 140. The processor 1513 controls functions performed by the communication module 1516. The memory 1514 may be utilized to store data used by the processor 1513 to perform its function. The memory 1514 may also store the data contained in the provisioning data 202, such as the secret key and the acceptance parameters.

The metrology module 1518 may include a processor 1521, memory 1522, and measurement circuitry 1523. The processor 1521 in the metrology module 1518 controls functions performed by the metrology module 1518. The memory 1522 stores data needed by the processor 1521 to perform its functions, such as the global token table 1010 used to validate a global token. In some examples, other data in the provisioning data 202 is also stored in the memory 1502 of the metrology module 1518, rather than in the memory 1514 of the communication module 1516. In either case, the communication module 1516 and the metrology module 1518 communicate with each other through the local connection 1530 to provide data needed by the other module. The measurement circuitry 1523 handles the measuring of the resource and may also handle the recording of measurements taken. Both the communication module 1516 and the metrology module 1518 may include computer-executable instructions stored in memory or in another type of computer-readable medium and one or more processors within the modules may execute the instructions to provide the functions described herein.

Example of a Headend System for Implementing Certain Embodiments

Figure 16:
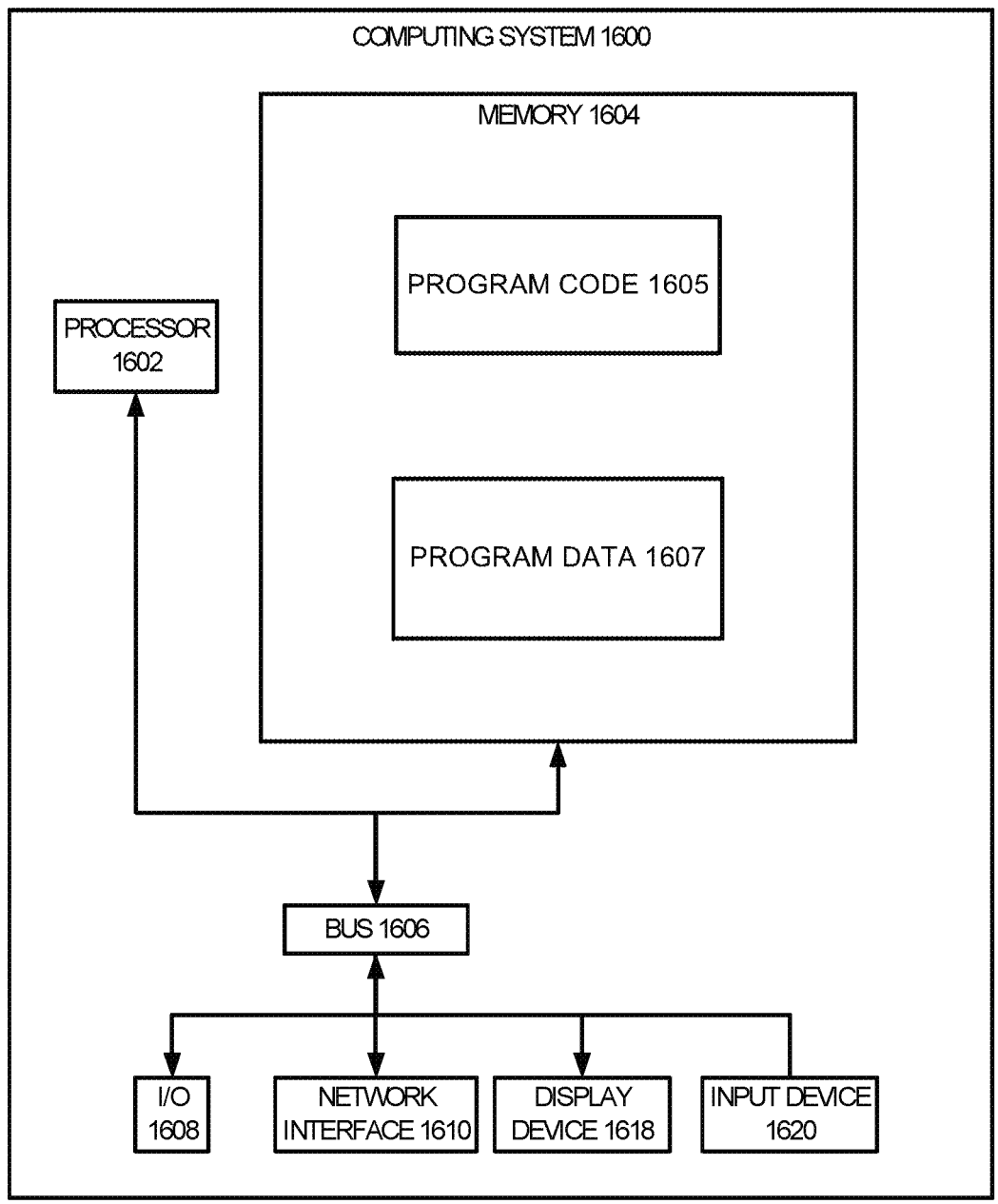
FIG. 16 is a block diagram depicting an example of a headend system suitable for implementing aspects of the techniques and technologies presented herein.

Any suitable computing system or group of computing systems can be used for performing the operations described herein. For example, FIG. 16 depicts an example of the computing system 1600. The implementation of computing system 1600 could be used for the headend system 104.

The depicted example of a computing system 1600 includes a processor 1602 communicatively coupled to one or more memory devices 1604. The processor 1602 executes computer-executable program code stored in a memory device 1604, accesses information stored in the memory device 1604, or both. Examples of the processor 1602 include a microprocessor, an application-specific integrated circuit ("ASIC"), a field-programmable gate array ("FPGA"), or any other suitable processing device. The processor 1602 can include any number of processing devices, including a single processing device.

A memory device 1604 includes any suitable non-transitory computer-readable medium for storing program code 1605 (e.g. the code used for generating the payment-based tokens or the time-based tokens), program data 1607 (e.g. the global token table), or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 1600 executes program code 1605 that configures the processor 1602 to perform one or more of the operations described herein. Examples of the program code 1605 include, in various embodiments, the program code used to generate the payment-based tokens, the program code used to generate the time-based tokens, the program code used to verify the payment-based tokens, time-based tokens or global tokens, or other suitable applications that perform one or more operations described herein. The program code may be resident in the memory device 1604 or any suitable computer-readable medium and may be executed by the processor 1602 or any other suitable processor.

In some embodiments, one or more memory devices 1604 stores program data 1607 that includes one or more datasets described herein. Examples of these datasets include past secure tokens, the global token table, etc. In some embodiments, one or more of data sets, models, and functions are stored in the same memory device (e.g., one of the memory devices 1604). In additional or alternative embodiments, one or more of the programs, data sets, models, and functions described herein are stored in different memory devices 1604 accessible via a data network. One or more buses 1606 are also included in the computing system 1600. The buses 1606 communicatively couples one or more components of a respective one of the computing system 1600.

In some embodiments, the computing system 1600 also includes a network interface device 1610. The network interface device 1610 includes any device or group of devices suitable for establishing a wired or wireless data connection to one or more data networks. Non-limiting examples of the network interface device 1610 include an Ethernet network adapter, a modem, and/or the like. The computing system 1600 is able to communicate with one or more other computing devices (e.g., the root nodes 114) via a data network using the network interface device 1610.

The computing system 1600 may also include a number of external or internal devices, an input device 1620, a presentation device 1618, or other input or output devices. For example, the computing system 1600 is shown with one or more input/output ("I/O") interfaces 1608. An I/O interface 1608 can receive input from input devices or provide output to output devices. An input device 1620 can include any device or group of devices suitable for receiving visual, auditory, or other suitable input that controls or affects the operations of the processor 1602. Non-limiting examples of the input device 1620 include a touchscreen, a mouse, a keyboard, a microphone, a separate mobile computing device, etc. A presentation device 1618 can include any device or group of devices suitable for providing visual, auditory, or other suitable sensory output. Non-limiting examples of the presentation device 1618 include a touchscreen, a monitor, a speaker, a separate mobile computing device, etc.

Although FIG. 16 depicts the input device 1620 and the presentation device 1618 as being local to the computing device that executes the headend system 104, other implementations are possible. For instance, in some embodiments, one or more of the input device 1620 and the presentation device 1618 can include a remote client-computing device that communicates with the computing system 1600 via the network interface device 1610 using one or more data networks described herein.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

The features discussed herein are not limited to any particular hardware architecture or configuration. A computing device can include any suitable arrangement of components that provide a result conditioned on one or more inputs. Suitable computing devices include multipurpose microprocessor-based computer systems accessing stored software (i.e., computer-readable instructions stored on a memory of the computer system) that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied; for example, blocks can be re-ordered, combined, and/or broken into sub-blocks. Certain blocks or processes can be performed in parallel.

The use of "adapted to" or "configured to" herein is meant as an open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Accordingly, it should be understood that the present disclosure has been presented for purposes of example rather than limitation and does not preclude inclusion of such modifications, variations, and/or additions to the present subject matter as would be readily apparent to one of ordinary skill in the art.

What is claimed is:

1. A method, comprising:
    sending, by a headend system, provisioning data to a meter via at least a mesh network, wherein the provisioning data is configured to cause the meter to operate in a mode for accepting time-based tokens, and wherein the meter is installed at a geographical location and configured to control a connection of premises associated with the meter to a resource distribution network;
    receiving, by the headend system, a request to generate a time-based token for the meter with a time duration;
    generating, by the headend system, the time-based token based on an identifier of the meter and the time duration; and
    transmitting, by the headend system, the time-based token to the meter over at least the mesh network, wherein the time-based token is useable by the meter to connect or disconnect the premises from the resource distribution network based on the time duration associated with the time-based token.

2. The method of claim 1, wherein the time-based token further comprises an integrity field generated by encrypting at least an identifier of the meter, wherein the integrity field is useable by the meter to validate the time-based token.

3. The method of claim 2, further comprising generating a serial number for the time-based token and including at least a portion of the serial number in the time-based token, wherein
    the integrity field of the time-based token is further generated by encrypting at least the serial number of the time-based token and the identifier of the meter.

4. The method of claim 1, further comprising:
    in response to receiving an event message from the meter that comprises a particular time-based token, verifying that the particular time-based token specified in the event message was generated by the headend system; and
    in response to determining that the particular time-based token was not generated by the headend system, transmitting to the meter a notification indicating that the time-based token was not generated by the headend system, wherein the notification causes the meter to connect or disconnect the premises from the resource distribution network based on a balance associated with the meter.

5. The method of claim 1, further comprising:
    receiving a response from the meter, wherein the response comprises one or more of the time-based token, a status of the time-based token, or a status of the meter, wherein the status of the time-based token comprises an accepted status or a rejected status, and wherein the status of the meter comprises a disconnected status or a connected status.

6. The method of claim 1, wherein the meter connecting or disconnecting the premises from the resource distribution network based on the time duration associated with the time-based token comprises:
    validating the time-based token by determining whether the time-based token is generated for the meter based on information related to an identifier of the meter; and
    in response to determining that the time-based token is valid, connecting, by the meter, premises associated with the meter to a resource distribution network for at least a time duration specified in the time-based token.

7. The method of claim 1, wherein the meter connecting or disconnecting the premises from the resource distribution network based on the time duration associated with the time-based token comprises:
    in response to determining that the time duration associated with the time-based token has passed, determining a balance associated with the meter; and
    disconnecting the premises associated with the meter from the resource distribution network in response to determining that the balance associated with the meter is below a threshold value.

8. A system, comprising:
    a processor; and
    a non-transitory computer-readable medium storing instructions which are executable by the processor to cause the processor to perform operations comprising:
        sending provisioning data to a meter via at least a mesh network, wherein the provisioning data is configured to cause the meter to operate in a mode for accepting time-based tokens, and wherein the meter is installed at a geographical location and configured to control a connection of premises associated with the meter to a resource distribution network;

receiving a request to generate a time-based token for the meter with a time duration;

generating the time-based token based on an identifier of the meter and the time duration; and transmitting the time-based token to the meter over at least the mesh network, wherein the time-based token is usable by the meter to connect or disconnect the premises from the resource distribution network based on the time duration associated with the time-based token.

9. The system of claim 8, wherein the time-based token further comprises an integrity field generated by encrypting at least an identifier of the meter, wherein the integrity field is useable by the meter to validate the time-based token.

10. The system of claim 9, further comprising generating a serial number for the time-based token and including at least a portion of the serial number in the time-based token, wherein the integrity field of the time-based token is further generated by encrypting at least the serial number of the time-based token and the identifier of the meter.

11. The system of claim 8, further comprising:

in response to receiving an event message from the meter that comprises a particular time-based token, verifying that the particular time-based token specified in the event message was generated by a headend system; and in response to determining that the particular time-based token was not generated by the headend system, transmitting to the meter a notification indicating that the time-based token was not generated by the headend system, wherein the notification causes the meter to connect or disconnect the premises from the resource distribution network based on a balance associated with the meter.

12. The system of claim 8, further comprising:

receiving a response from the meter, wherein the response comprises one or more of the time-based token, a status of the time-based token, or a status of the meter, wherein the status of the time-based token comprises an accepted status or a rejected status, and wherein the status of the meter comprises a disconnected status or a connected status.

13. The system of claim 8, wherein the meter connecting or disconnecting the premises from the resource distribution network based on the time duration associated with the time-based token comprises:

validating the time-based token by determining whether the time-based token is generated for the meter based on information related to an identifier of the meter; and in response to determining that the time-based token is valid, connecting, by the meter, premises associated with the meter to a resource distribution network for at least a time duration specified in the time-based token.

14. The system of claim 8, wherein the meter connecting or disconnecting the premises from the resource distribution network based on the time duration associated with the time-based token comprises:

in response to determining that the time duration associated with the time-based token has passed, determining a balance associated with the meter; and disconnecting the premises associated with the meter from the resource distribution network in response to determining that the balance associated with the meter is below a threshold value.

15. A non-transitory computer-readable medium storing instructions which are executable by a processor to cause the processor to perform operations comprising:

sending provisioning data to a meter via at least a mesh network, wherein the provisioning data is configured to cause the meter to operate in a mode for accepting time-based tokens, and wherein the meter is installed at a geographical location and configured to control a connection of premises associated with the meter to a resource distribution network;

receiving a request to generate a time-based token for the meter with a time duration;

generating the time-based token based on an identifier of the meter and the time duration; and transmitting the time-based token to the meter over at least the mesh network, wherein the time-based token is usable by the meter to connect or disconnect the premises from the resource distribution network based on the time duration associated with the time-based token.

16. The non-transitory computer-readable medium of claim 15, wherein the time-based token further comprises an integrity field generated by encrypting at least an identifier of the meter, wherein the integrity field is useable by the meter to validate the time-based token.

17. The non-transitory computer-readable medium of claim 16, further comprising generating a serial number for the time-based token and including at least a portion of the serial number in the time-based token, wherein the integrity field of the time-based token is further generated by encrypting at least the serial number of the time-based token and the identifier of the meter.

18. The non-transitory computer-readable medium of claim 15, further comprising:

in response to receiving an event message from the meter that comprises a particular time-based token, verifying that the particular time-based token specified in the event message was generated by a headend system; and in response to determining that the particular time-based token was not generated by the headend system, transmitting to the meter a notification indicating that the time-based token was not generated by the headend system, wherein the notification causes the meter to connect or disconnect the premises from the resource distribution network based on a balance associated with the meter.

19. The non-transitory computer-readable medium of claim 15, further comprising:

receiving a response from the meter, wherein the response comprises one or more of the time-based token, a status of the time-based token, or a status of the meter, wherein the status of the time-based token comprises an accepted status or a rejected status, and wherein the status of the meter comprises a disconnected status or a connected status.

20. The non-transitory computer-readable medium of claim 15, wherein the meter connecting or disconnecting the premises from the resource distribution network based on the time duration associated with the time-based token comprises:

validating the time-based token by determining whether the time-based token is generated for the meter based on information related to an identifier of the meter; and in response to determining that the time-based token is valid, connecting, by the meter, premises associated with the meter to a resource distribution network for at least a time duration specified in the time-based token.

\* \* \* \* \*